(12) United States Patent
Golden et al.

(10) Patent No.: US 10,612,678 B1
(45) Date of Patent: Apr. 7, 2020

(54) METHOD OF SERVICING AN ELECTRONICALLY CONTROLLED PRV SYSTEM

(71) Applicant: Telos Industries Inc., Dickinson, ND (US)

(72) Inventors: Jason A. Golden, Dickinson, ND (US); Dustin J. Adams, Dickinson, ND (US); Terry G. Wilcox, Dickinson, ND (US)

(73) Assignee: Telos Industries Inc., Dickinson, ND (US)

( * ) Notice: Subject to any disclaimer, the term of this patent is extended or adjusted under 35 U.S.C. 154(b) by 225 days.

(21) Appl. No.: 15/977,833

(22) Filed: May 11, 2018

Related U.S. Application Data

(63) Continuation-in-part of application No. 15/922,129, filed on Mar. 15, 2018, now Pat. No. 10,550,665.

(60) Provisional application No. 62/549,815, filed on Aug. 24, 2017, provisional application No. 62/568,308, filed on Oct. 4, 2017.

(51) Int. Cl.
| | |
|---|---|
| *E21B 43/26* | (2006.01) |
| *E21B 34/16* | (2006.01) |
| *F16K 17/04* | (2006.01) |
| *F02M 63/02* | (2006.01) |
| *F02M 59/46* | (2006.01) |

(52) U.S. Cl.
CPC ......... *F16K 17/0406* (2013.01); *F02M 59/46* (2013.01); *F02M 63/0215* (2013.01)

(58) Field of Classification Search
CPC .................................. E21B 43/26; E21B 34/16
See application file for complete search history.

(56) References Cited

U.S. PATENT DOCUMENTS

| | | | |
|---|---|---|---|
| 4,766,728 A * | 8/1988 | Glomeau | ................ F15B 11/08 60/476 |
| 5,431,182 A * | 7/1995 | Brown | ...................... G05B 6/05 137/487.5 |
| 8,763,983 B2 | 7/2014 | Lymberopoulos et al. | |

(Continued)

OTHER PUBLICATIONS

Ryan House, Mike Pry and Jason Pitcher, "The Value of Pressure Relief in Hydraulic Fracturing Operations" (May 1, 2017) Offshore Technology Conference in Houston, Texas.

(Continued)

*Primary Examiner* — Kenneth L Thompson
(74) *Attorney, Agent, or Firm* — Peter Brewer; Thrive IP

(57) ABSTRACT

A method of servicing a pressure relief valve system for a fluid injection system is provided. The method includes providing a skid, with the skid having a frame that supports a horizontal I-beam overhead. The method also includes providing a pressure relieve valve ("PRV") system supported by a platform of the skid. The PRV system comprises one or more pressure transducers configured to sense fluid pressure within the fluid injection system. The transducers then generate electrical signals representative of fluid pressure readings within the fluid injection system in real time. Signals are received by a controller which compares pressure readings with a stored pressure threshold. An actuation signal is sent upon detecting a signal representative of a pressure that exceeds the stored pressure threshold, causing an electraulically-actuated valve to rotatably move to an open position. Plug valves may be quickly removed for service using a hoist system supported by the skid.

20 Claims, 10 Drawing Sheets

(56) References Cited

U.S. PATENT DOCUMENTS

| | | |
|---|---|---|
| 8,851,108 B2 | 10/2014 | Lymberopoulos |
| 8,978,695 B2 | 3/2015 | Witkowski et al. |
| 8,998,168 B2 | 4/2015 | Witkowski et al. |
| 9,057,448 B2 | 6/2015 | Lymberopoulos |
| 9,103,448 B2 | 8/2015 | Witkowski et al. |
| 9,103,465 B2 | 8/2015 | Lymberopoulos |
| 9,163,619 B2 | 10/2015 | Lymberopoulos |
| 9,163,750 B2 | 10/2015 | Lymberopoulos et al. |
| 9,273,543 B2 | 3/2016 | Baca |
| 9,322,243 B2 | 4/2016 | Baca |
| 9,341,056 B2 * | 5/2016 | Weightman ............. E21B 47/06 |
| 9,341,279 B2 | 5/2016 | McNabney et al. |
| 9,353,775 B2 | 5/2016 | Young |
| 9,353,882 B2 | 5/2016 | Young |
| 9,395,015 B2 | 7/2016 | Young |
| 9,429,241 B2 | 8/2016 | Eagen |
| 9,441,453 B2 | 9/2016 | Lymberopoulos |
| 9,518,675 B2 | 12/2016 | Cook |
| 9,671,794 B1 | 6/2017 | Lymberopoulos et al. |
| 9,857,807 B2 | 1/2018 | Baca et al. |
| 10,289,125 B2 * | 5/2019 | Imel ........................ F04B 47/02 |
| 10,550,665 B1 * | 2/2020 | Golden ................. F16K 37/005 |
| 2010/0154894 A1 | 6/2010 | Kotapish et al. |
| 2012/0031494 A1 | 2/2012 | Lymberopoulos |
| 2012/0073670 A1 | 3/2012 | Lymberopoulos |
| 2012/0227983 A1 | 9/2012 | Lymberopoulos et al. |
| 2013/0000745 A1 | 1/2013 | Witkowski et al. |
| 2013/0020519 A1 | 1/2013 | Lymberopoulos |
| 2015/0042088 A1 | 2/2015 | Witkowski et al. |
| 2015/0292297 A1 * | 10/2015 | Kajaria ................... E21B 34/02 166/250.01 |
| 2015/0345646 A1 | 12/2015 | Witkowski et al. |
| 2016/0161956 A1 | 6/2016 | Baca |
| 2017/0147012 A1 | 5/2017 | Lymberopoulos et al. |
| 2017/0285668 A1 | 10/2017 | Moseley et al. |

OTHER PUBLICATIONS

Utility U.S. Appl. No. 15/922,129, filed Mar. 15, 2018.

* cited by examiner

METHOD OF SERVICING AN ELECTRONICALLY CONTROLLED PRV SYSTEM

CROSS REFERENCE TO RELATED APPLICATIONS

This application claims the benefit of U.S. Ser. No. 62/549,048 entitled "Electronically Controlled Pressure Relieve Valve System." That application was filed on Aug. 24, 2017.

This application also claims the benefit of U.S. Ser. No. 62/568,308, also entitled "Electronically Controlled Pressure Relieve Valve System." That application was filed on Oct. 4, 2017, and is incorporated herein in its entirety by reference.

This application is further filed as a continuation-in-part of U.S. Pat. No. 10,550,665 entitled "Electronically Controlled Pressure Relieve Valve System." That application was filed on Mar. 15, 2018, and is also incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of pressure relief valves. More specifically, the invention relates to a pressure relief system that is electronically controlled. In some aspects, the invention may be used in connection with a hydraulic fracturing operation or a downhole hydraulic jetting operation at a well site. The invention further relates to methods of servicing a PRV system.

Technology in the Field of the Invention

In the drilling of an oil and gas well, a near-vertical wellbore is formed through the earth using a drill bit urged downwardly at a lower end of a drill string. The drill bit is rotated in order to form the wellbore, while drilling fluid is pumped through the drill string and back up to the surface on the back side of the pipe. The drilling fluid serves to cool the bit and flush drill cuttings during rotation.

After drilling to a predetermined vertical depth, the wellbore may be deviated. The deviation may be at a "kick-off" angle of, for example, 45 degrees or 60 degrees. This enables the operator to form multiple wellbores that penetrate a target formation from essentially a single well pad.

Within the last two decades, advances in drilling technology have enabled oil and gas operators to economically "kick-off" and steer wellbore trajectories from a generally vertical orientation to a generally horizontal orientation. This represents a 90-degree deviation. The horizontal "leg" of each of these wellbores now often exceeds a length of one mile, if not two miles. This significantly multiplies the wellbore exposure to a target hydrocarbon-bearing formation (or "pay zone"). For example, for a given target pay zone having a (vertical) thickness of 100 feet, a one mile horizontal leg exposes 52.8 times as much pay zone to a horizontal wellbore as compared to the 100-foot exposure of a conventional vertical wellbore.

FIG. 1 provides a cross-sectional view of a wellbore 100 having been completed in a horizontal orientation. It can be seen that the wellbore 100 has been formed from the earth surface 11, through numerous earth strata 20a, 20b, . . . 20h and down to a hydrocarbon-producing formation 30. The subsurface formation 30 represents a "pay zone" for the oil and gas operator. The wellbore 100 includes a vertical section 40a above the pay zone 30, and a horizontal section 40c. The horizontal section 40c defines a heel 40b and a toe 40d, along with an elongated leg there between that extends along the pay zone 30.

In connection with the completion of the wellbore 100, several strings of casing having progressively smaller outer diameters have been cemented into the wellbore 100. These include a string of surface casing 60 and one or more strings of intermediate casing 70. The casing strings 60, 70 are typically cemented into place, with a cement column being shown at 75. It is understood that while only one string of intermediate casing 70 is illustrated in FIG. 1, a deeper wellbore will likely have at least two if not three intermediate casing strings 70.

In addition, a lowest string of casing 80 is placed in the wellbore 100. The lowest string of casing 80, referred to as a production casing, is typically cemented into place as well. (See cement column 90.) In some completions, the production casing 80 has external casing packers ("ECP's"), swell packers, or some combination thereof spaced across the productive interval in lieu of cement. This creates compartments along the horizontal leg 40c for the isolation of zones and for specific stimulation treatments.

As part of the completion process and before a production tubing string is installed, the production casing 80 is perforated at a desired level 40c. This means that lateral holes are shot through the production casing 80 and the cement column 45 surrounding the casing 80. The perforations allow reservoir fluids to flow into the wellbore 40c. Where swell (or other) packers are provided, the perforating gun penetrates the casing 80, allowing reservoir fluids to flow from the rock formation into the wellbore 40c along selected zones.

After perforating, the formation 30 is typically fractured along the corresponding zones. Hydraulic fracturing consists of injecting water with friction reducers or viscous fluids (usually shear thinning, non-Newtonian gels or emulsions) into a formation at such high pressures and rates that the reservoir rock parts and forms a network of fractures 50. The fracturing fluid is typically mixed with a proppant material such as sand, ceramic beads or other granular materials. The proppant serves to hold the fractures 50 open after the hydraulic pressures are released. In the case of so-called "tight" or unconventional formations, the combination of fractures 50 and injected proppant substantially increases the flow capacity, or permeability, of the treated reservoir.

FIG. 1 demonstrates a series of fracture half-planes 25 along the horizontal section 40c of the wellbore 100. The fracture half-planes 25 represent the orientation of fractures 50 that will form in connection with a perforating/fracturing operation. According to principles of geo-mechanics, fracture planes will generally form in a direction that is perpendicular to the plane of least principal stress in a rock matrix. Stated more simply, in most wellbores, the rock matrix will part along vertical lines when the horizontal section of a wellbore resides below 3,000 feet, and sometimes as shallow as 1,500 feet, below the surface. In this instance, hydraulic fractures will tend to propagate from the wellbore's perforations in a vertical, elliptical plane perpendicular to the plane of least principal stress. If the orientation of the least principal stress plane is known, the longitudinal axis of the horizontal leg 40c is ideally oriented parallel to it such that the multiple fracture planes 25 will intersect the wellbore at-or-near orthogonal to the horizontal leg 40c of the wellbore, as depicted in FIG. 1.

In support of the formation fracturing process, specialized equipment is brought to the wellsite. This equipment may include, for example, water tanks, sand trucks, chemical tanks, and blenders. The blenders are used to mix the water, sand and chemicals. In addition, high pressure frac pumps are provided in order to inject the blended materials, or fracturing fluid, into the wellbore. A so-called hydraulic "frac" tree 65 may be installed over the wellbore 100 to receive the pressured fracturing fluid and direct it downhole.

As part of the equipment, a so-called "frac missile" (shown in FIGS. 8 and 9) is used to receive fluid from the various frac pumps. The frac missile acts as a fluid collections manifold, collecting the fracturing fluid from the fluid lines into a single high-pressure line. The high-pressure line directs the fracturing fluid from the high pressure frac tanks to the frac tree 65. In one arrangement, the fracturing fluids are directed to a separate frac manifold, which controls the delivery of injection fluids to a plurality of wells at a well site.

In any event, fracturing fluid is injected through flow control valves in the frac tree 65 and into the wellbore 100 at high pressures. Such pressures are frequently in excess of 5,000 psi and oftentimes in excess of about 12,500 psi.

Those of ordinary skill in the art will understand that fracturing fluids are not injected directly into the production casing 80; rather, they are injected through a working string, such as a string of coiled tubing (not shown). Bridge plugs may be placed along the wellbore in stages to direct fracturing fluid through the various production zones, sequentially. These bridge plugs may operate with balls that seal on seats, or may be resettable, or may be drilled out. The current inventions are not specific to any formation fracturing equipment used downhole.

The ability to form a series of fracture planes 25 along a single horizontal wellbore 40c has made the production of hydrocarbon reserves from unconventional reservoirs, and particularly shales, economically viable within recent times. Baker Hughes Rig Count information for the United States indicates only about one out of every fifteen (7%) of wells being drilled in the U.S. are now classified as "Vertical", whereas the remainder are classified as either "Horizontal" or "Directional" (85% and 8%, respectively). This means that horizontal wells currently comprise approximately six out of every seven wells being drilled in the United States.

In most fracturing operations, a so-called "pop-off" valve is provided as a safety precaution. A pop-off valve is a relief valve that serves as a secondary pressure-regulating device. The pop-off valve (not shown) resides along or is otherwise in fluid communication with the high-pressure fluid injection line. If the pressure-regulating device built into the fracturing pumps (or, optionally, the frac missile or the frac manifold) fails at a set system pressure, the hydro-mechanical pop-off valve will open and allow fracturing fluids to flow there-through before reaching the frac tree 65. In this way, fluids are released from the fluid injection system and pressure is relieved.

Recently, more sophisticated pressure relief valve (or "PRV") systems have been introduced to the industry. Specifically, KLX Inc. of Houston, Tex. has introduced a frac relief valve system, known generically as a FRV. The KLX FRV incorporates one or more gate valves that are operated by an accumulator system. U.S. Patent Publ. No. 2017/0285668 presents a version of a KLX FRV.

Safoco Inc., of Houston, Tex., has its own FRV. The Safoco FRV also utilizes a gate valve that is controlled by a "fail open" hydraulic actuator. In the Safoco FRV, pressure is sensed by a pressure transducer. The pressures at which the valve opens and re-closes are field programmable via a keypad interface. U.S. Pat. No. 9,671,794 is an example of a Safoco FRV.

FRV systems protect the integrity of the wellhead and reduce equipment failures such as blown tubing and cracked pumps. FRV systems monitor pressures along the high-pressure line and seek to maintain pressure in the system at or below a rated limit for the associated fracturing equipment.

Known FRV systems rely upon gate valves, which are notoriously slow to open. In this respect, gate valves are opened and closed by applying numerous revolutions to an elongated, threaded shaft. In addition, gate valves can be slow and difficult to cycle during lubrication and maintenance procedures. Accordingly, an improved FRV system is needed for high pressure fluid injection operations at a well site wherein a valve may be opened rapidly with less than one complete revolution by an actuator. Further, a need exists for an improved method of servicing a PRV system at a well site, wherein rotatably-actuated valves are used in the PRV system.

BRIEF SUMMARY OF THE INVENTION

An electronically controlled pressure relief valve ("PRV") system is provided herein. The PRV system is designed to be portable, and may be used as a safety mechanism for any high-pressure fluid injection operation. The pressure relief valve system herein is ideally suited for use in connection with wellbore drilling operations, formation fracturing operations, water-flooding (or "injector") operations or water disposal operations at a wellsite.

In an exemplary embodiment, a system controller is provided. The system controller is configured to generate an actuation signal when the controller determines that pressure in the fluid injection system exceeds a stored pressure threshold. The actuation signal is sent to an actuator which actuates a valve. Actuation of the valve causes the valve to rotatably move from a closed state to an open state, permitting injection fluids to rapidly by-pass, or exit, the fluid injection system.

In the present disclosure, the valve is an electraulically-actuated valve. Examples of such valves are plug valves, poppet valves and sleeve valves. Preferably, two plug valves are used in series, with each plug valve being moved by a respective actuator. Beneficially, the plug valves may be rotatably moved from their closed states to their respective open states in less than 1.5 seconds, or even less than 0.5 seconds, and with less than one complete revolution.

In one embodiment, the pressure relief valve system first includes one or more pressure transducers. Each of the pressure transducers is configured to sense fluid pressure within or along the fluid injection system. The pressure transducers are configured to generate electrical signals representative of fluid pressure readings within the fluid injection system. Beneficially, the signals are generated in real time.

The PRV system also includes a system controller. The controller is configured to receive the electrical signals from the one or more pressure transducers, and process those signals. Processing includes comparing fluid pressure readings taken by the one or more pressure transducers with a stored pressure threshold. The controller is programmable so that an operator may set the stored pressure threshold to a desired value.

The pressure relief valve system further includes a fluid inlet. The fluid inlet is configured to receive fluids moving through the fluid injection system. Preferably, the high-pressure line is teed into an inlet of the PRV to place the inlet in fluid communication with the high-pressure fluid injection line. Ideally, at least one of the pressure transducers resides proximate the fluid inlet or somewhere between a frac missile and the PRV system along the high-pressure injection line.

The PRV system additionally comprises one or more hydraulically-activated valves. The one or more hydraulically-activated valves may be, for example, a plug valve. Each valve is configured to move between a closed state and an open state. In its open state, fluid pressure in the fluid injection system is relieved through a fluid relief outlet associated with its respective plug valve.

The pressure relief valve system also includes an actuator. Specifically, an actuator is associated with each of the plug valves. Each actuator is configured to rotatably move a respective plug valve from its closed state to its open state. This is done in response to an actuation signal sent from the system controller. In operation, the controller sends the actuation signal when a fluid pressure reading taken by one of the one or more pressure transducers exceeds the stored pressure threshold. The actuation signal will cause the actuators to open their respective plug valve.

Of course, if the system controller receives signals indicating that the fluid injection system is operating below the stored pressure threshold, the controller will continue to monitor pressure readings and maintain the one or more hydraulically-activated valves in its closed position.

Optionally, the PRV system comprises a flow meter. The flow meter is positioned along an FRV outlet and is configured to measure the flow rate of injection fluids when the plug valve is moved to its open state. The flow meter may also calculate total injection fluid volume moving through the flow meter during a plug valve open state condition. Such a condition is referred to as a "relief event."

It is preferred that the fluid injection system be located at a well site. For example, the fluid injection system may be a hydraulic fracturing system for a well completion (including a re-completion) operation. In this instance, the fluid injection system will include one or more chemical tanks, one or more sand bins, one or more water tanks, and a mixer or blender. The fluid injection system will further include one or more high-pressure frac pumps and a frac tree. The frac tree is disposed over a wellbore and includes flow control valves for controlling the high pressure injection of fracturing fluids into the wellbore.

In a preferred arrangement, a high-pressure line extends from the high pressure frac pumps, or from a manifold (or "frac missile") associated with the high-pressure frac pumps, to a frac manifold. Jumper lines then carry injection fluids from the frac manifold to a frac tree at a selected well. The pressure relief valve system may be teed off of the high-pressure line downstream of the frac missile such that the fluid inlet receives the fracturing fluids directly from the high-pressure line.

In the PRV system, the system controller is configured to emit an actuation signal to change the state of the plug valve from its closed state to its open state. The actuation signal is sent when the controller determines that a pressure in the fluid injection system at the well site meets or exceeds the stored pressure threshold. In one aspect, the controller receives signals from multiple pressure transducers indicative of pressure at multiple locations along the fluid injection system, including at the high-pressure frac pumps, the frac missile, the high-pressure line, the fluid inlet, a frac manifold and/or a flow control valve associated with the frac tree. Pressure readings from the multiple pressure transducers may be compared and analyzed. In this way, the controller may be able to distinguish between normal pressure kicks, temporary screen out conditions, and undesirable pressure build-up conditions that require an actuation signal.

In one embodiment, the pressure relief valve system further includes a mechanical pop-off valve. The mechanical pop-off valve is in fluid communication with the fluid injection line and is configured to open and relieve pressure within the fluid injection system in the event pressure readings taken by one of the one or more pressure transducers reaches a set point greater than the stored pressure threshold. In other words, the actuators or associated plug valves fail due to electrical failure, mechanical failure, or both. This is an additional safety feature.

Preferably, the pressure relief valve system resides on a skid. The skid comprises a platform for supporting components of the PRV system. The skid also comprises lift points configured to enable lifting by a winch line.

It is also preferred that the pressure relief valve system includes on-board batteries. The batteries are configured to provide power to the system controller and to the actuators.

A method of servicing a PRV system is also provided herein. The method employs the electronically controlled pressure relief valve system described above in its various embodiments. The method has particular utility in connection with a formation fracturing operation at a well site, though it may be used in connection with a wellbore drilling operation or an operation involving the injection of fluids into a wellbore. For example, the wellbore operation may be the hydraulic jetting of mini-lateral boreholes using a jetting hose downhole. In this instance, injection fluids are pumped at high pressures through the jetting hose and a connected jetting nozzle while the jetting hose is advanced forward into the formation. Alternatively, the PRV system may be utilized in connection with high-pressure fluid pumping in connection with a non-oil and gas operation such as a hydraulic blasting operation.

The method first comprises providing a skid. The skid defines a steel frame having a platform. A plurality of beams extend upward from the platform, and support a horizontal I-beam. The horizontal I-beam runs across the skid at a location above the actuators and associated valves. The I-beam includes a trolley that moves by virtue of wheels or bearings along the I-beam.

The method also includes providing an electronically controlled pressure relief valve system. The PRV system is supported by the platform of the skid. In the context of a formation fracturing operation or other "upstream" operation, the PRV system is provided proximate a wellbore. The wellbore has been formed (or is being formed) for the purpose of producing hydrocarbon fluids to the surface in commercially viable quantities. Alternatively, the wellbore is provided for the purpose of injecting or disposing of fluids into a subsurface formation.

In one aspect, providing the PRV system includes rigging up the PRV skid. This means that a pressure relief valve (such as an FRV) system residing on a skid is placed in an area designated by a service company representative or a well operator. This may be done, for example, by operating lifting equipment having one or more winch lines in order to pick up the skid at lift points, and then lower the skid proximate a designated location at the well site.

The method also includes placing the pressure relief valve system in fluid communication with a high-pressure injection line. Ideally, the high-pressure line extends from high pressure frac tanks (or a manifold or central valving associated with the high pressure frac tanks) to a frac tree over the wellbore. The high-pressure line is teed into an inlet of the PRV. Preferably at least one of the one or more pressure transducers is located proximate the inlet of the PRV.

The method will additionally include providing power to the PRV system. In one aspect, providing power means that batteries associated with the PRV system are turned on. More preferably, providing power means that an all-weather extension cord is run from a 115-120 volt AC power source to a plug associated with the PRV system. Connecting the extension cord will cause the batteries and the accumulator to begin charging.

It is noted that providing power to the PRV system includes providing power to the system controller. The operator may need to look inside of the battery box to turn on the buss breaker. This enables power to be sent to the system controller and to the actuators and any actuator controller.

As noted above, the PRV system is configured to be maintained in the closed state during fluid injection operations. The closed state is maintained by keeping the one or more plug valves closed. As part of the rig-up process, it is desirable to check the operation of the electraulically actuated valves. This is done by sending a test signal to the actuators to cause the valves to be rotatably opened. To do this, an ethernet cable is run from the system controller to a test computer, which may be a laptop or other computer associated with the operator, such as the operator's vehicle. Operational software associated with the system controller is loaded or otherwise activated, and communication is established between the operator's computer and the system controller.

The method next includes sending a test signal from the test computer to the pressure relief valve system. This causes the actuators to rotatably cycle the electraulically actuated valves. Preferably, the valves are plug valves that are rotatably moved from their closed states to their respective open states in less than 0.5 seconds, and with less than one complete revolution.

In one aspect of the method, before or in lieu of cycling the valves, the operator will change out the rotatably actuated valves. This requires that an actuator mounting bracket be disconnected from its respective valve. This is preferably done by using a hex driver and, optionally, a breaker bar to remove bolts from the mounting brackets.

After all bolts are removed from the mounting brackets, a chain hoist (sometimes referred to in the industry as a "come-along") is moved into place over an actuator. The chain hoist is attached to the trolley so that it may be slidably moved into place over each of the valves, one at a time. A lifting sling is connected to the chain hoist.

The method then includes placing the lifting sling under an actuator, and then operating the chain hoist to lift the actuator off of the valve. Preferably, a stem adapter associated with the actuator remains on top of a stem of the plug valve. This ensures that damage is not done to the stem during lifting and moving. The actuator is then hoisted up and trollied to the side.

The method next includes changing out the valve. This involves securing a custom plug-lifting device to the plug. The plug-lifting device may comprise a plate, and an elongated handle having bars extending away from a center-opening in the plate in opposing directions. The plate has bolt holes configured to align with the bolt holes on the plug valve. The plate is then placed onto the plug valve, and the bolts are placed through respective bolt holes and threadedly tightened back into the corresponding bolt holes of the valve. Using the two handles, the plug-lifting device and connected plug valve are then lifted out of the valve housing associated with the PRV skid, and moved away from the skid. This process is repeated for the second plug valve.

The method finally includes installing new plug valves. This is done by reversing the steps associated with removing the old plug valves. The actuators are then placed back onto the respective plug valves using the chain hoist and trolley and are bolted into place.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
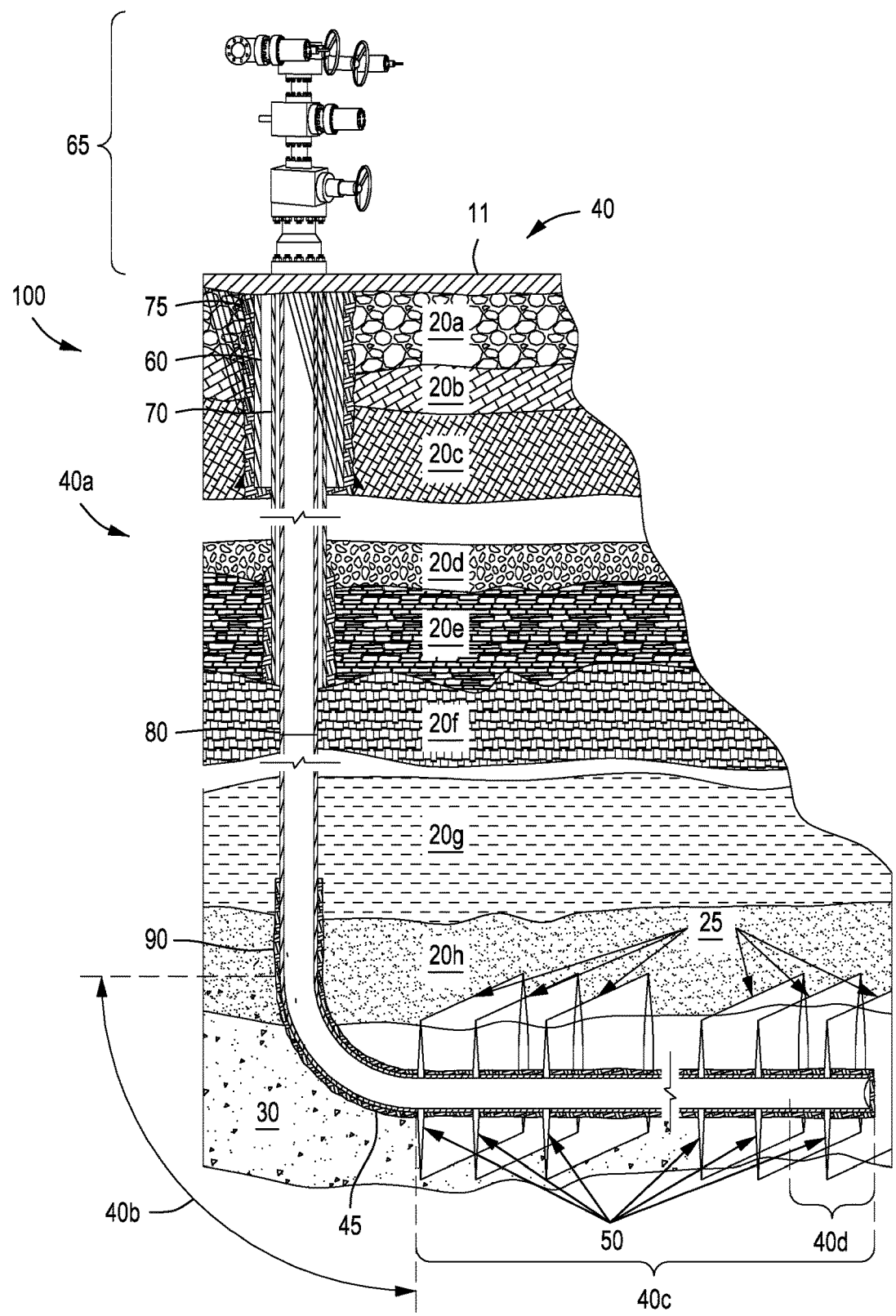
FIG. 1 is cross-sectional view of a wellbore having been completed with a horizontal leg. The illustrative wellbore has undergone a hydraulic fracturing operation.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "injection fluids" means fluids being passed under high pressure from pumps along a high-pressure line. Such fluids may be, for example, fracturing fluids being pumped to a frac tree at a wellbore.

As used herein, the term "wellbore fluids" means water, hydrocarbon fluids, formation fluids, or any other fluids that may be within a wellbore during a production operation.

As used herein, the term "gas" refers to a fluid that is in its vapor phase.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore." The term "bore" refers to the diametric opening formed in the subsurface by the drilling process.

Description of Selected Specific Embodiments

Figure 2:
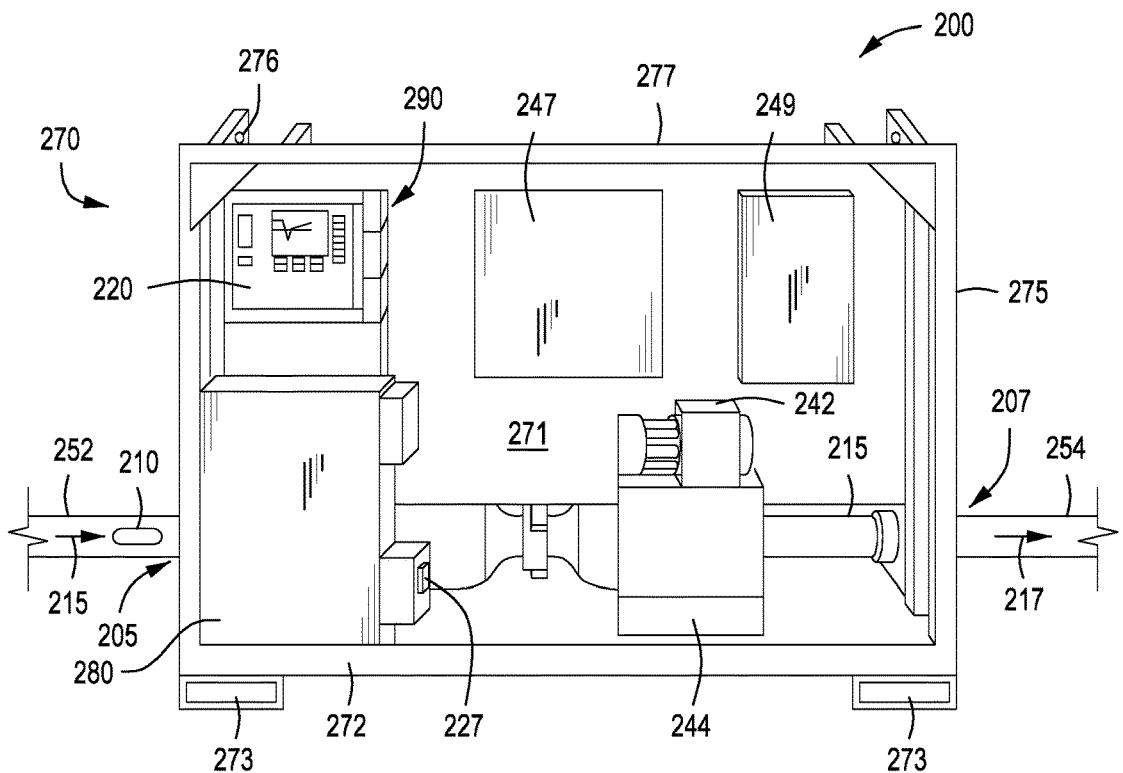
FIG. 2 is a front perspective view of a pressure relief valve system of the present invention, in one embodiment. The pressure relief valve system is mounted onto a platform, or skid, for portability.

FIG. 2 is a front perspective view of a pressure relief valve system 200 of the present invention, in one embodiment. The valve system 200 is designed to serve as a safety mechanism in connection with a high-pressure fluid injection operation. The pressure relief valve system 200 is electronically controlled, and has particular utility in connection with a formation fracturing operation. While the system 200 may be used in connection with other high-pressure fluid pumping systems, it will be described herein primarily in the context of a formation fracturing operation for illustration.

Figure 3:
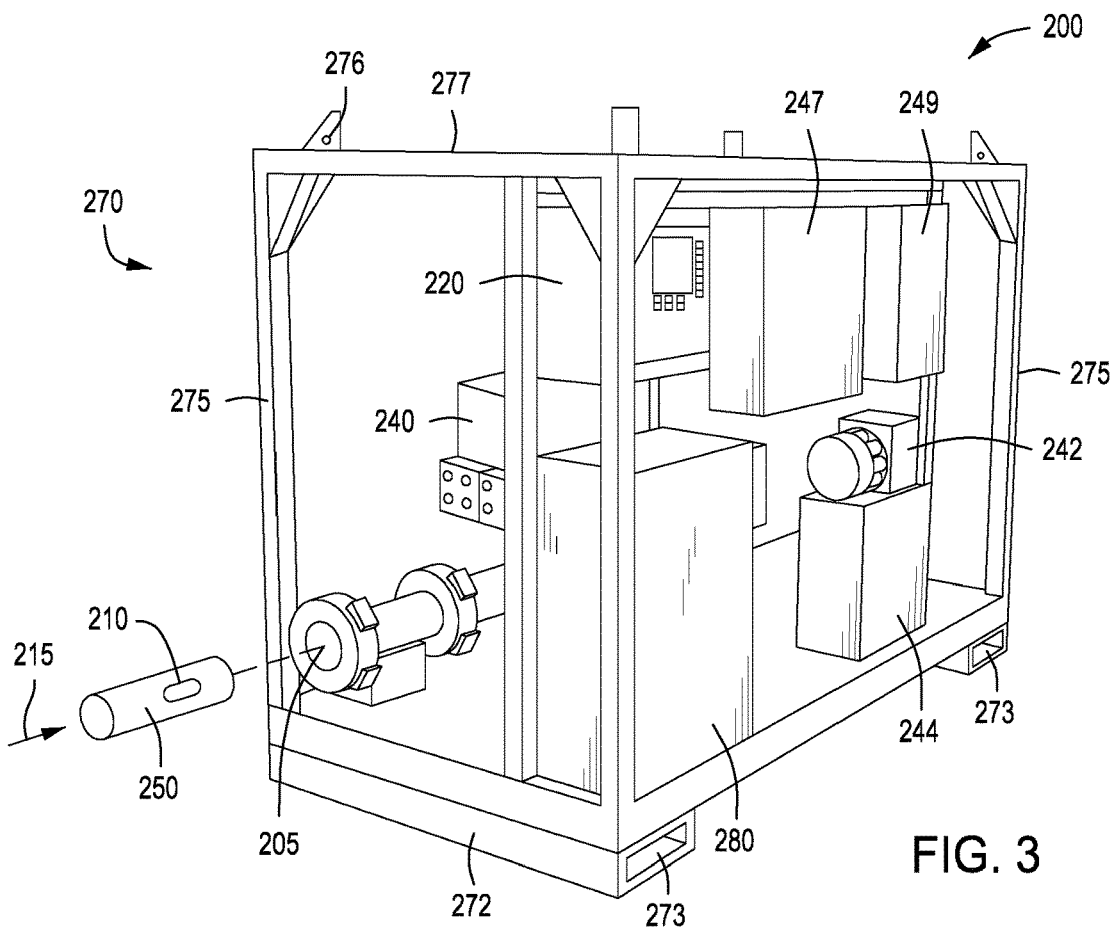
FIG. 3 is another perspective view of the pressure relief valve system of FIG. 2, mounted onto the skid. Here, the view is taken from a left, front corner of the system. Several vertical support beams associated with the skid are visible.

FIG. 3 is another perspective view of the pressure relief valve system 200 of FIG. 2, mounted onto a platform, or skid 270. Here, the view is taken from a left front corner of the system 200.

Figure 4A:
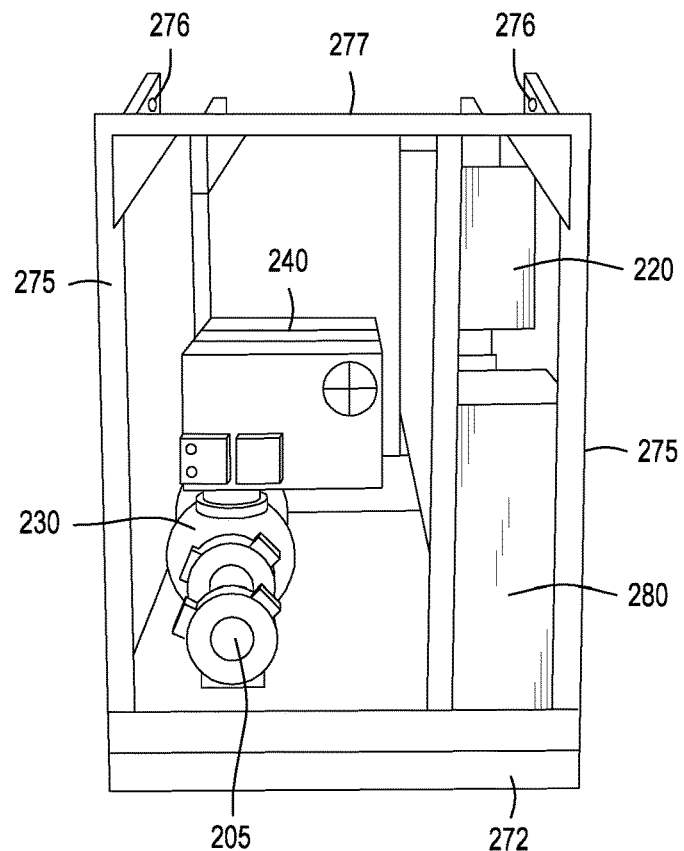
FIG. 4A is still another perspective view of the pressure relief valve system of FIG. 2, mounted onto the skid. Here, the view is take from the left (or fluid inlet) side of the system.

FIG. 4A is still another perspective view of the pressure relief valve system 200 of FIG. 2, mounted onto the skid 270. Here, the view is take from the left side of the system 200. A fluid inlet is shown at 205.

Figure 4B:
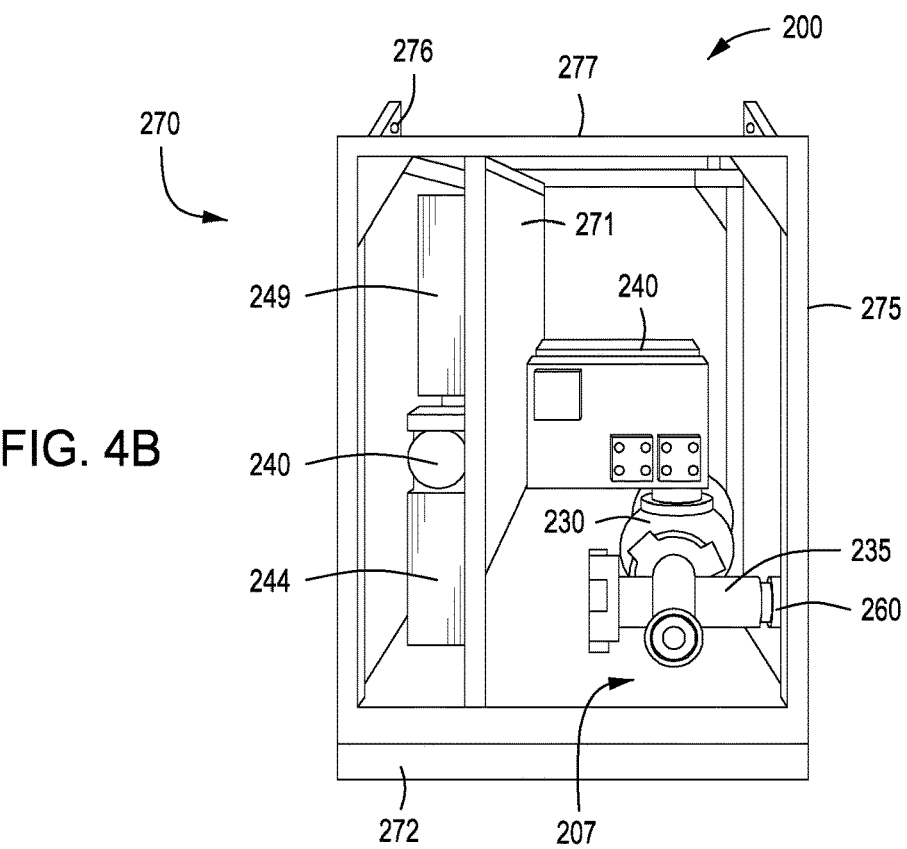
FIG. 4B is a perspective view of the pressure relief valve system of FIG. 2, seen from the right (or fluid outlet) side of the system.

FIG. 4B is a perspective view of the pressure relief valve system 200 of FIG. 2, seen from the right side of the system 200. This is the fluid outlet side of the system 200. A fluid outlet is shown at 207.

Figure 5:
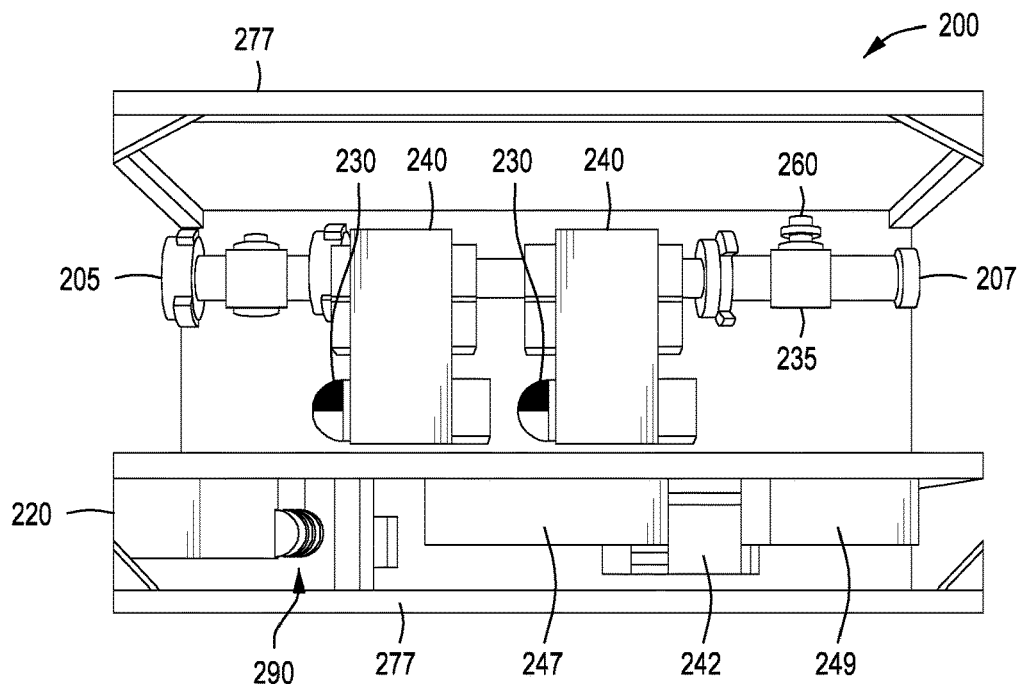
FIG. 5 is a top perspective view of the pressure relief valve system of FIG. 2. A horizontal I-beam associated with the skid is removed for illustrative purposes.

FIG. 5 is a top perspective view of the pressure relief valve system 200 of FIG. 2. Here, an I-beam that resides across an upper end of framing forming the skid 270 is removed for illustrative purposes. The I-beam may be seen in FIG. 8 at 278.

Figure 6A:
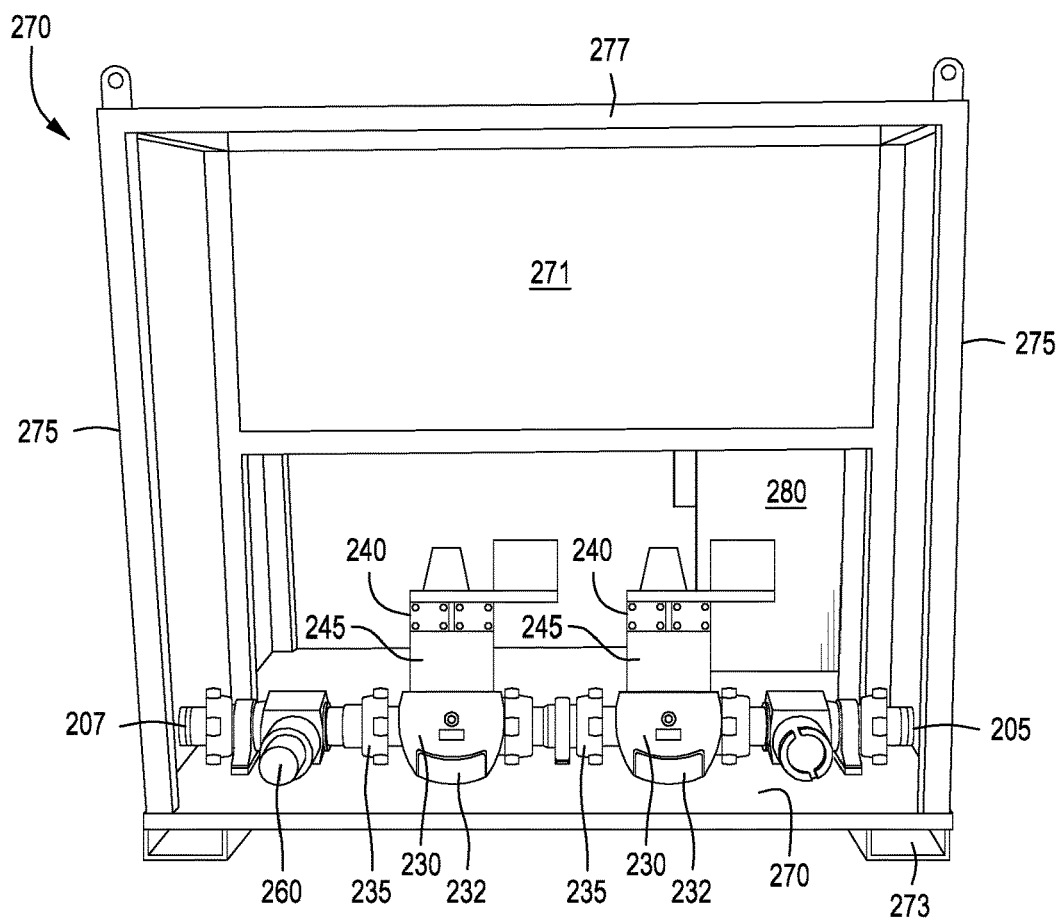
FIG. 6A is still another perspective view of the pressure relief valve system of FIG. 2. Here, the view is take from the rear of the system.
Figure 6B:
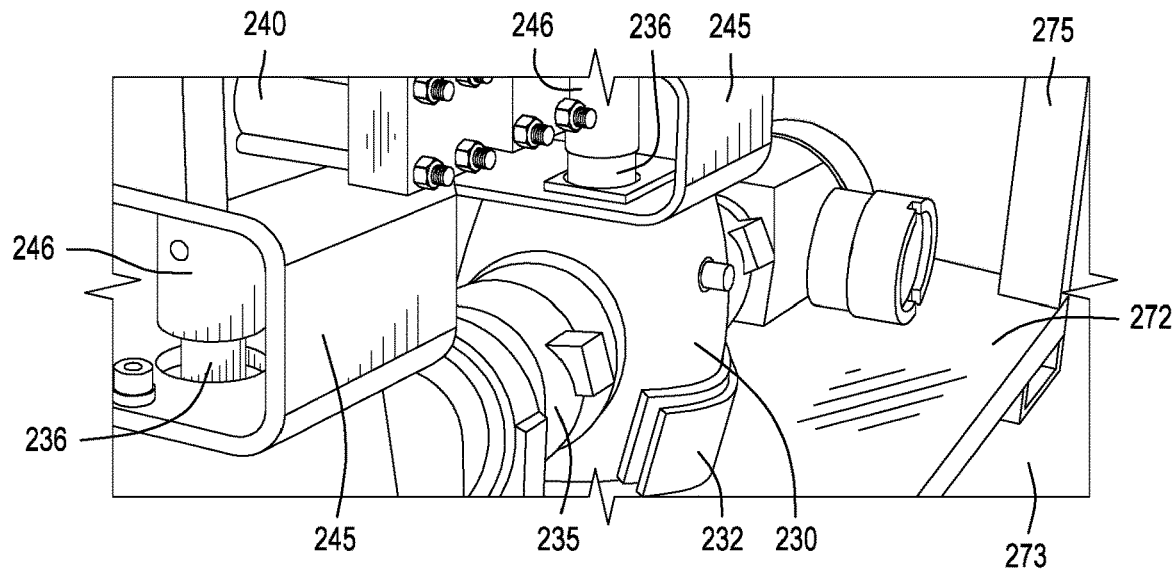
FIG. 6B is an enlarged view of a portion of an actuator residing on a plug valve.

FIG. 6 is still another perspective view of the pressure relief valve system 200 of FIG. 2. Here, the view is take from the rear of the system 200.

The pressure relief valve system 200 will be first discussed in connection with FIGS. 2, 3, 4A, 4B, 5 and 6 together.

The pressure relief valve system 200 first includes one or more pressure transducers 210. Each of the pressure transducers 210 is configured to sense fluid pressure within a fluid injection system. The fluid injection system is preferably a hydraulic fracturing system or a drilling fluid circulation system. The pressure transducers 210 generate electrical signals representative of fluid pressure readings within the fluid injection system. The signals are generated in real time.

In one aspect, each of the one or more pressure transducers 210 is a high-pressure Viatran™ pressure transmitter available from Viatran Corporation of Tonawanda, N.Y. For example, the Model 570 4-20 mA pressure transmitter may be used. This pressure transmitter is rated p to 100,000 psi. Certain Viatran™ transducers provide for an input of 10.5 to 28 VDC.

In FIGS. 2 and 3, a single transducer 210 is shown. The transducer 210 is disposed along a fluid inlet line 252. Arrow 215 indicates an inflow of the high-pressure fluids. Preferably, the high-pressure fluids are fracturing fluids. Arrow 215 shows the inflow of the fluids into the FRV 200 adjacent the pressure transducer 210, while Arrow 217 shows an outflow caused by a "relief event."

The fluid inlet line 252 may be a part of a high-pressure injection line. Such an arrangement is shown schematically in FIG. 8, wherein the fluid injection line is indicated at 250. In this instance, a relief line 865 is provided. More preferably, the fluid inlet line 250 is a dedicated bypass line that tees off of the fluid injection line 250. This is shown at 252 in FIG. 9. In this instance, a relief line 254 extends from the fluid outlet 207.

In either aspect, the pressure relief valve system 200 also includes a system controller 220. The system controller 220 is configured to receive the electrical signals from the one or more pressure transducers 210, and process those signals. Processing includes comparing fluid pressure readings taken by the one or more pressure transducers 210 with a previously-stored pressure threshold. The controller 220 is programmable so that an operator may set the stored pressure threshold to a desired value. The controller 220 may be programmed through a keypad interface or, more preferably, remotely through a laptop computer (not shown).

The system controller 220 may be a programmable logic controller (PLC), an embedded controller, or any controller suitable for the oil well applications environments. In one aspect, the controller 220 is capable of performing proportional-integral-derivative (PID) loop control or a subset such as PI loop controls. This enables various data signals to be processed and analyzed in real time. If the process controller is a PLC, the programming language is typically ladder logic. In the case of an imbedded controls implementation, the programming software is typically some form of "c" such as c or c++, or perhaps in a version of Basic such as T Basic.

In the arrangement of FIG. 2, the controller 220 is an MDT Data Acquisition Control Computer. In another embodiment, the controller 220 is a Triangle Research EZWire 1616 that provides integrated, field wiring ready I/O terminals. The Triangle Research EZWire 1616 controller is an embedded programmable logic controller (or "PLC") with operations software downloaded thereon. This controller is able to perform advanced floating point math, and has 16 digital inputs and 16 digital outputs.

The controller 220 provides digital and analog I/O points with its own power (+24V or +5V) and 0V on a 3-level screwless terminal. In one embodiment, the controller has eight analog inputs and four analog outputs. Every sensor and actuator in a control system can be wired directly to the PLC without requiring additional screw terminal blocks and wire-harnesses. The PLC may offer an RS485 pinout cable connector.

The controller 220 has an RS232 male header. This serves as a data terminal equipment (DTE) connector. The DTE connector converts user information into signals, or reconverts received serial signals. The PLC 220 also has an RS232 female header. This serves as data circuit-terminating equipment DTE connector. The DTE device may communicate with the DTE device.

The controller 220 further optionally includes an Ethernet port. The Ethernet port may connect to other devices or web servers for control or data up/down loading. The controller additionally includes a back-up battery.

The pressure relief valve system 200 further includes a fluid inlet 205. The fluid inlet 205 is configured to communicate with fluids moving through the fluid injection line 250 (seen best in FIG. 9, discussed below). Preferably, at least one of the one or more pressure transducers 210 is positioned proximate the fluid inlet 205. The system 200 further includes a fluid outlet 207 for releasing high pressure fluids during a relief event. The system 200 and its fluid inlet 205 and fluid outlet 207 reside adjacent to the fluid injection line 250, connected by a bypass line 252 (seen in FIG. 9).

The pressure relief valve system 200 additionally comprises one or more valves 230. The illustrative valves 230 are plug valves. Each plug valve 230 is configured to rotatably move between a closed state and an open state. In its open state, fluid pressure in the fluid injection system 200 is relieved through the fluid outlet 207. Each plug valve 230 is preferably designed to reside along a 3" line, but this is merely designer's choice.

In one aspect, each plug valve 230 is a ULT plug valve available from FMC Technologies of Houston, Tex. The ULT plug valve is rated to 15,000 psi and is specifically designed to handle or tolerate slick water, sand, proppant/gel and cement chips. Of interest, the ULT plug valve utilizes dual segment seals that reduce erosive fluid flow between the seal segments and the plug valve body.

The pressure relief valve system 200 also includes an actuator 240. Specifically, an actuator 240 is provided for each plug valve 230. In one aspect, each actuator 240 resides on top of a corresponding plug valve 230. Each actuator 240 is configured to move its respective plug valve 230 from its closed state to its open state. This is done by rotating a stem (seen in FIG. 11B at 234) in response to an actuation signal from the controller 220. In operation, the controller 220 sends the actuation signal when a fluid pressure reading taken by one of the one or more pressure transducers 210 exceeds the stored pressure threshold. The stem 234 then turns the plug valve 230, moving it to its open position.

In one aspect, the actuator 240 is a REXA Electraulic™ Actuator available from Rexa, Inc. of Houston, Tex. Rexa, Inc. makes both linear and rotary actuators. In the current inventions, the rotary actuator is preferred. In one embodiment, the actuator 240 operates with an associated accumulator 245. The accumulator 245 stores (or is charged with) pressurized hydraulic fluid for activating the actuator 240 and rotating its corresponding valve 230 for at least several cycles.

The accumulator 245, in turn, operates with an accumulator motor 242. The accumulator motor 242 may be referred to as a hydraulic pump and supplies pressure to the accumulator 240. The accumulator 245 thus defines an accumulator reservoir. The accumulator motor 242 is electric while the accumulator reservoir holds a hydraulic fluid. Thus, an "electraulic" actuation system is used, meaning that the actuators 240 are turned by a combination of electric and hydraulic power.

In one aspect, a hydraulic sensor is coupled to the accumulator 245 to monitor the stored charge. The sensor provides indications of the stored charge to the system controller 220 so that the controller 220 can maintain the charge in the accumulator 245 at a desired level. As an example, if the hydraulic sensor detects that the charge in the accumulator 245 drops below a level that is sufficient to activate the actuator 240 and its corresponding valve 230

(e.g., 3,000 psi), then the controller 220 energizes the accumulator motor 242 to re-charge the accumulator 245 with fluid from the reservoir. When the hydraulic sensor detects that the accumulator 245 has been re-charged to a desired level (e.g., 4,550 psi), then the controller 220 de-energizes the accumulator motor 242.

The actuator 240 may have its own controller 247 and associated circuit board. In the example of FIG. 2, the actuator controller 247 is a Rexa Actuator Computer Controller. A Rexa Inverter is shown at 249. The Rexa inverter 249 converts AC power (which is what the actuator 240 runs off of) to DC power. In this way, the system 200 is reliant on two, 100-amp batteries that get charged off of four bank battery chargers. The batteries are not shown, but reside within a battery box 280.

It is noted that in the arrangement of FIG. 2, the system 200 utilizes two plug valves 230 and two actuators 240. Each plug valve 230 is located below a respective actuator 240. Each plug valve 230 will have a stem 234 extending vertically up into the actuator 240. Upon receiving an actuation signal, the actuator 240 will rotate its respective stem adapter (not visible) to move the valve 230 into its open position. Preferably, the rotation is only 90-degrees, and no more than 180-degrees. In this way, each valve 230 may be opened more quickly, such as in less than 1.5 seconds. More preferably, each rotation takes place in less than 0.5 seconds, or even less than 0.3 seconds.

As noted above, existing FRV systems utilize gate valves. Gate valves are slow to cycle due to the high number of revolutions required to translate in and out of the valve opening, creating a high risk of screen-out, a pressure leak or even a catastrophic blowout before the relief valve is fully opened. Existing FRV systems can take as long as 10.0 seconds to open a gate valve. Further, seats within gate valves are highly susceptible to erosion in the presence of the sand-laden fracturing fluid due to the extended length of time it takes to open and close. In contrast, the present PRV system utilizes at least one and, optionally, two plug valves 230, with each plug valve 230 being held on the platform 272 by a seat 232. The actuator 240 is capable of cycling a plug valve 230 in less than 1.5 seconds, and preferably less than one second, greatly minimizing seat exposure to the abrasive fluid. In some instances, a full open/close cycle can take place in 0.5 seconds or even 0.25 seconds. This represents a significant improvement over the prior art.

Beneficially, with a plug valve 230, the system controller 220 may be programmed to send a separate maintenance signal to each plug valve 230. The maintenance signal causes the actuator 240 to initiate incremental movements of the plug valve 230 to allow for proper greasing. This, of course, is done when the fluid injection system is offline or shut down. Such a maintenance signal allows each valve to be fully cycled in no more than one or two seconds, enabling rapid lubrication.

Optionally, the pressure relief valve system 200 comprises a flow meter 235. The flow meter 235 is configured to measure the flow rate of injection fluids when the plug valve 230 is moved to its open state. The flow meter 235 may also calculate total injection fluid volume moving through the flow meter 235 during a plug valve 230 open state condition (or "relief event"). Arrow 865 of FIG. 8 demonstrates a direction of fluid flow during a relief event. Diverted injection fluids are collected in an open retaining pit, or "catch tank" 860.

It is preferred that the fluid injection system 200 is located at a well site, such as near wellbore 100. For example, the fluid injection system 200 may be a hydraulic fracturing system for a well completion operation. In this instance, the fluid injection system will include one or more chemical tanks, one or more sand bins, one or more water tanks, and a mixer or blender. The fluid injection system will further include one or more high pressure frac pumps and a frac tree.

Figure 8:
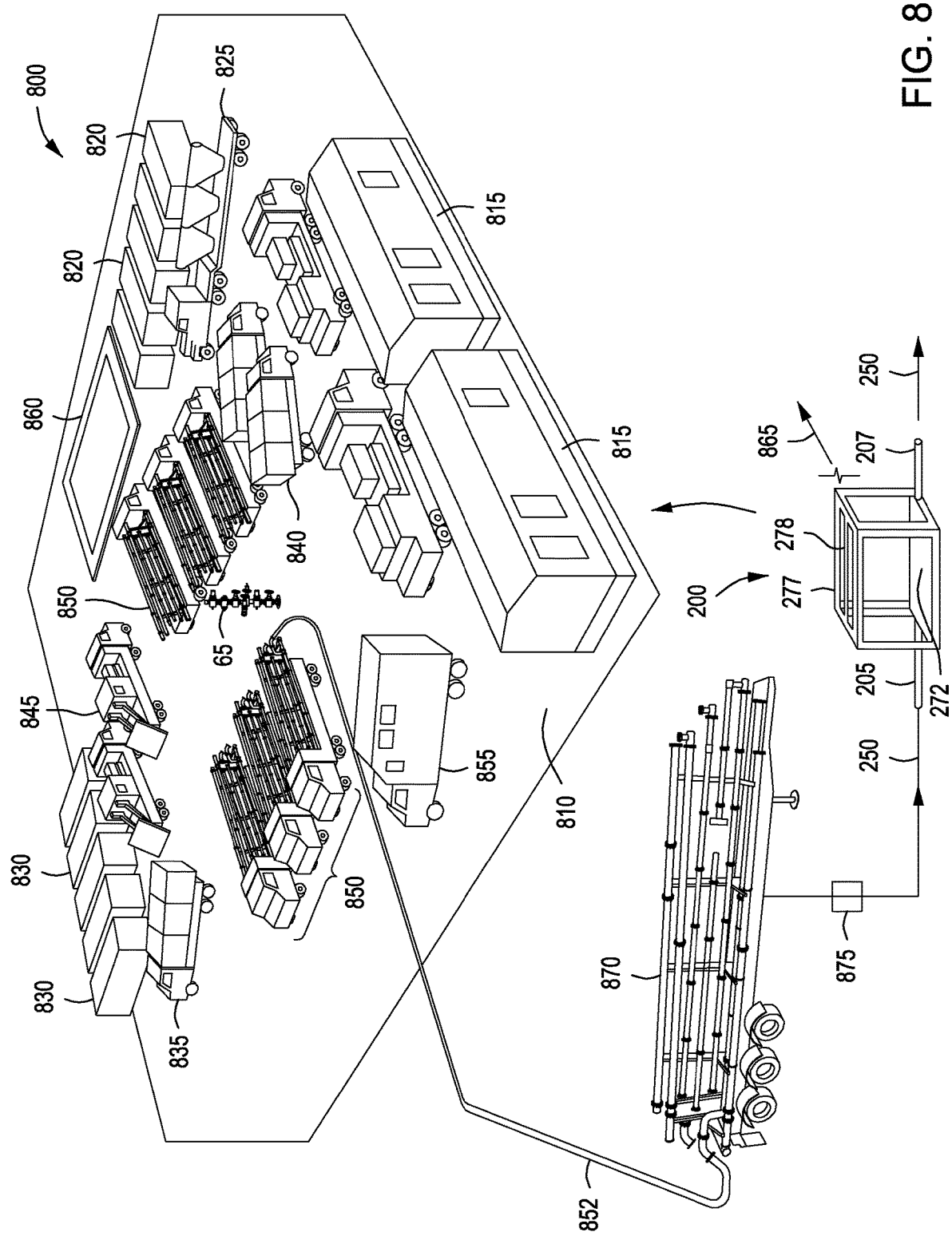
FIG. 8 is a somewhat schematic view of a well site undergoing a high-pressure fluid injection (or fluid pumping) operation, in one embodiment. A high-pressure injection line is shown transporting injection fluids to a frac tree over a wellbore.

FIG. 8 is a schematic view of a well site 800 undergoing a high-pressure fluid injection operation. The well site 800 includes a so-called pad 810, which represents an area where the surface has been prepared for drilling and completion operations. The pad 810 may be, for example, two to four acres in area.

The well site also includes a frac tree 65. The frac tree 65 is disposed over a wellbore (such as wellbore 100) and includes flow control valves for controlling the high-pressure injection of fracturing fluids into the wellbore. The frac tree 65 is intended to represent the frac tree 65 from FIG. 1. It is understood that the current inventions are not limited by the architecture of the well tree.

The well site 800 also includes one or more so-called dog houses 815. These represent areas where service personnel and operators may work and live during the drilling and completion operations. Not every site will include dog houses 815; these are simply provided for completeness of disclosure.

The well site 800 also shows sand storage units 820 that have been brought on location 810. The sand storage units 820 represent large, portable bins that hold proppant used as part of an injection slurry. In one aspect, the sand storage units 820 represent trailers having wheels that are pulled by trucks to the location 800. More preferably, the sand storage units 820 are stationary bins that are filled by sand dump trucks 825.

The well site 800 also includes frac storage tanks 830. The frac storage tanks 830 have been brought on location 810 using trucks (not shown). In one aspect, the frac storage tanks 830 represent trailers having water containers that are carried by trucks to the location 800. More preferably, the frac storage tanks 830 are stationary tanks that are filled by water transport trucks 835. In either instance, the tanks 830 contain brine used as the carrier medium for the injection fluid.

The well site 800 also shows that chemical storage trucks 840 have been driven onto the pad 810. The chemical storage trucks 840 carry surfactants or other chemicals (typically referred to as "slickwater") that are mixed with the brine of the frac storage tanks 830 to reduce friction. The chemicals may also optionally include biocides, scale inhibitors and stabilizers as well as guar gum, which is used as a thickening agent. The chemicals are mixed along with the sand into the brine using so-called frac blenders 845.

The well site 800 of FIG. 8 also shows a series of frac pumps 850. Each of the frac pumps 850 is preferably part of a truck that is configured to receive injection fluids from the frac blenders 845, and then send them under high pressure through the high-pressure injection line 250.

It is understood that in an actual hydraulic "fracking" operation, fluids are pumped into different portions of a horizontal wellbore in stages. In addition, a series of different fluids may be pumped into each stage, including for example an acid stage, a slickwater stage (having no proppant), a proppant stage and a flushing stage. This application is not intended to be a primer on hydraulic fracturing, and the person of ordinary skill in the art will be familiar with the fracking process. For purposes of the present disclosure, all of these fluids, individually and together, are consider "injection fluids" or "fracturing fluids."

Figure 9:
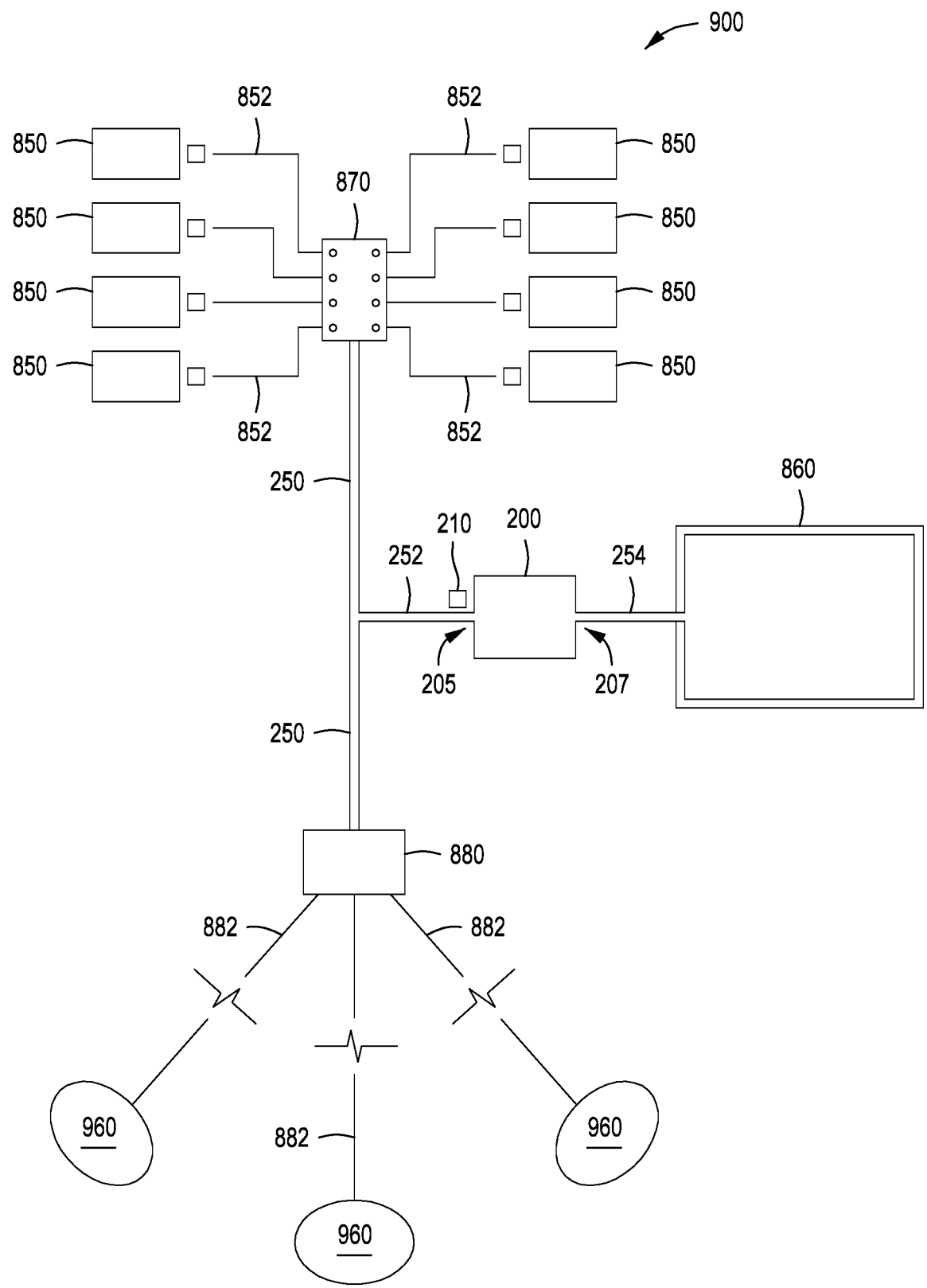
FIG. 9 is a schematic view of a well site wherein multiple wells are placed (or "zippered") at the well site. The wells are undergoing formation fracturing operations.

Injection fluids are received at the pressure relief valve 200, shown somewhat schematically in FIG. 8. In one aspect, fluid pressures are monitored as they are passed through the inlet 205 and across the PRV 200. More preferably, and as shown in FIG. 9, injection fluids flow through the injection line 250 and to a frac manifold 880 en route to a plurality of wells 960. Line 252 tees off of injection line 250 and places the PRV inlet 205 in fluid (and in pressure) communication with the injection line 250.

In any event, if a pressure is detected along the high-pressure injection line 250 (such as at or proximate to the inlet 205) that exceeds the designated threshold pressure, then the plug valves 230 are opened and injection fluids are released through relief line 865. Injection fluids are diverted to an open-pit tank 860 at the pad 810/900.

It is understood that the pressure relief valve system 200 may, and preferably will, include more than one plug valve 230. It is also understood that the at least one plug valve 230 may be any valve that is actuated through the accumulator motor 242 augmented with hydraulic fluid residing in a fluid reservoir using an actuator 240. This is provided that the actuator 240 is able to open the valve 230 (or rotatably move the valve from a closed state to a full open state) in less than about 1.5 seconds. Examples of suitable alternatives to plug valves are poppet valves and sleeve valves, each of which includes a rotating stem 234.

Preferably, each valve 230 is able to be moved from its full closed position to its full open position with less than one full revolution of a stem 234 by the actuator 940. More preferably, actuation is accomplished through a single 90-degree turn.

FIG. 9 is a schematic view of a well site 900 wherein multiple wells 960 are placed at the well site 900. The wells 960 are undergoing formation fracturing operations, meaning the fracturing fluid is being injected into wellbores and formations associated with the respective wells 960. Those of ordinary skill in the art will understand that in some cases multiple wells will be fractured together, in stages, taking advantage of the same frac storage tanks 830 and other equipment at a well site. Illustrative well site 900 does not include all of the components of the well site 800, but only shows the progression of injection fluids from the high-pressure pumping trucks 850.

In FIG. 9, a plurality of pumping trucks 850 is shown. A fluid feed line 852 extends from each pumping truck 850 to a frac missile 870. From there, the injection fluids tee into the high-pressure injection line 250. Injection fluids are transported to a frac manifold 880. Those of ordinary skill in the art will understand that the frac manifold 880 comprises a series of pipes and valves designed to receive injection fluids from the frac missile 870 and then divert them to selected wells 960.

FIG. 9 also shows the placement of the PRV 200 relative to the fluid injection line 250. It is seen that bypass line 252 places the fluid injection line 250 in fluid communication with the fluid inlet 205 for the PRV 200. A pressure transducer 210 is located proximate to the fluid inlet 205. Here, the fluid outlet is seen at line 254.

In the preferred arrangement, the high-pressure line 250 extends from the frac missile 870 to a manifold 880. There, the fluid injection line 250 separates into a plurality of distinct injection lines 882, each of which is configured to transport frac fluids to respective frac trees 65 located at wells 960. The frac manifold 880 will include appropriate valves for controlling the flow of frac fluids to selected wells 960. Of course, where only one well 960 is present, then the frac manifold 880 and separate injection lines 882 are not needed. In any instance, the fluid inlet 205 is able to receive injection fluids through bypass line 252.

In the pressure relief valve system 200, the system controller 220 is configured to generate an actuation signal to change the state of the one or more plug valves 230 from its closed state to its open state. The actuation signal is sent when the controller 220 determines that a pressure in the fluid injection system 200 at the well site 900 exceeds the stored pressure threshold. During operation, the transducer 210 may take 10, or 20, or even 50 pressure readings each second, with each reading being sent to the controller 220 in real time.

In an exemplary embodiment, the controller 220 is configured to generate the actuation signal when the controller 220 determines that the pressure in a fluid injection system exceeds a stored pressure threshold. The controller 220 may be programmed to record a number of relief events, line pressure histories and voltages.

In one aspect, a single reading by a single transducer 210 indicating that pressure in the high-pressure line 250 has met or exceeded the stored pressure threshold will trigger the actuation signal from the system controller 220. A separate signal is then sent by the system controller 220 to the separate controller 247 that controls the actuator(s) 240.

In another aspect, pressure readings taken by the single transducer 210 are recorded by the controller 220 in real time. These pressure readings may then be averaged over time, such as over 0.5 to 3.0 seconds, to smooth out anomalies and to avoid false screen-out indications. The average may be, for example, a moving average, a mode, a median or derived via other averaging technique.

In another aspect, a plurality of transducers take pressure readings simultaneously. Such transducers may be placed along the high-pressure line 250, at the fluid inlet 205, at the frac missile 870, at the frac manifold 880, or combinations thereof. The readings may be averaged by the controller 220 over time, such as by computing a moving average of each separate transducer over 0.5 to 3.0 seconds, or a moving average of the average readings of the plurality of transducers. More preferably, if any one of the transducers records a pressure reading (meaning that an electrical signal indicative of a pressure is sent to the controller 220), that meets or exceeds the stored threshold pressure a single time, then the controller 220 initiates the valve-opening process based on that single reading.

In one embodiment, the pressure relief valve system 200 further includes a mechanical pop-off valve 260 (seen in FIG. 4B). The mechanical pop-off valve 260 is located downstream of the plug valve(s) 230, and is configured to open and relieve pressure within the fluid injection system 200 in the event pressure readings taken by one of the one or more pressure transducers 210 reaches a set point greater than the stored pressure threshold, but the plug valve(s) 230 fails to open. This is an additional safety feature.

Preferably, the pressure relief valve system 200 includes on-board batteries. It is understood that the lead line for reference 280 in FIG. 2 is directed to a housing (or battery box) for the batteries, but for illustrative purposes the battery box may also represent the batteries 280. The batteries 280 are configured to provide power to the controllers 220, 247 and to the actuators 240. In one aspect, the batteries 280 provide a 24-volt power source, which comes from two on-board 12-volt batteries. The batteries 280 may be charged using an on-board battery charger that receives power input from a nearby source of power, such as shore power or an onsite generator (not shown).

In one embodiment, a light stack 290 is provided for the pressure relief valve system 200. The light stack 290 gives a visual indicator in real time as to the status of the system 200. For example, the light stack 290 may display different colors for different status readouts. Preferably, the light stack 290 includes a plurality of LED lights and a graphical user interface, wherein the GUI is displays data associated with the pressure relief valve system 200. The data associated with the pressure relief valve system 200 may include, for example, data associated with system pressure measurements obtained by the one or more transducers 210, data obtained by hydraulic pressure measurements associated with the actuator, and an operating status of the actuator 240.

In one aspect of the invention, a high-pressure de-sander 875 is employed at the well site 800. The de-sander 875 resides along the fluid injection line 250, relatively close to the fluid inlet 205. The de-sander 875 may be a gravity de-sander, but preferably is a vertical de-sander such as the SynPOL™ de-sander manufactured by Specialized Desanders Inc. of Calgary, Alberta. Alternatively, the de-sander 875 may be one or more hydro-cyclones such as the Desander Hydrocyclones of Process Group Pty Ltd located in Melbourne, Australia.

In operation, when the system controller 220 issues an actuation signal to the actuator controller 247, an actuation signal is also sent to the de-sander 875. The de-sander then begins to remove proppant from the fluid injection line 250. It is understood that fracturing fluid slurries suspend large volumes of sand (or other proppant material). A de-sander may not be able to remove all, or even a majority of, the proppant from the line 250. However, any amount that is removed will help protect the electraulically-actuated valves 230 from the abrasive high-pressure fluid, saving the operator time and money in connection with valve maintenance.

As can be seen, an electronically controlled pressure relief valve system is provided. The pressure relief valve system is designed to be portable, and may be used as a safety mechanism for any high-pressure fluid pumping operation. The pressure relief valve system herein is ideally suited for use in connection with fluid injection operations or formation fracturing operations at a wellsite.

A method of controlling pressures during a wellbore operation is also provided herein. The method employs the electronically controlled pressure relief valve system 200 described above in its various embodiments. The method has particular utility in connection with a formation fracturing operation. Formation fracturing includes traditional hydraulic fracturing of injection fluids through perforations or through ported collars downhole.

For purposes of the present method, formation fracturing also includes the injection of fluids through a small-diameter hose having a connected jetting nozzle, wherein the hose is advanced into the wellbore and further out into the surrounding formation during injection. One example of such a system is found in U.S. Pat. No. 9,567,820 entitled "Tubular System for Jet Drilling." Another such system is disclosed in U.S. Pat. No. 8,991,522 entitled "Downhole Hydraulic Jetting Assembly, and Method For Stimulating A Production Wellbore." Still another example is found in U.S. Pat. No. 8,196,680 entitled "Perforating and Jet Drilling Method and Apparatus." Each of these patents is incorporated herein in its entirety by reference.

For purposes of the method of servicing a PRV valve herein, the PRV system may also be used for injecting fluids into an existing wellbore for disposal, or into a wellbore using mud pumps during a drilling operation in connection with mud pumps. Alternatively, the pressure relief valve system may be utilized in connection with a non-oil and gas operation, such as hydraulic blasting.

The method first comprises providing the electronically controlled pressure relief valve system 200. In the context of a formation fracturing operation or other "upstream" operation, the system is provided proximate a wellbore or is otherwise at a well site. The wellbore has been formed for the purpose of producing hydrocarbon fluids to the surface in commercially viable quantities. Alternatively, the wellbore is provided for the purpose of injecting or for the disposal of fluids into a subsurface formation.

The method also includes placing the pressure relief valve system in fluid communication with a high-pressure injection line. Ideally, the high-pressure line extends from high pressure frac pumps to a frac tree over the wellbore. Preferably, a frac missile is placed along the high-pressure line downstream from the frac pumps, with the pressure relief valve system residing between the frac missile and a frac manifold.

As noted above, the pressure relief valve system is configured to be maintained in the closed state during fluid injection operations. The closed state is maintained by keeping the one or more electronically-controlled, hydraulically actuated valves closed.

The method next includes setting one or more pressure threshold values for the pressure relief valve system. This is preferably done by providing inputs for a programmable controller. The controller is configured to receive data from the one or more pressure transducers as described above, and then compare the pressures as sensed by the transducer(s) to the stored pressure threshold.

The method further includes receiving signals from the one or more pressure transducers placed along the high-pressure line. It is understood that for purposes of the present disclosure, the term "along the high-pressure line" includes a transducer that resides adjacent a fluid inlet to the PRV where the PRV is teed off of the high-pressure line. Signals may be sent through a wireless protocol such as Zigbee or Bluetooth. Alternatively, signals may be sent through a wireless communications network. Alternatively still, signals may be sent through insulated wires or data cables. Additional transducers may reside at a frac missile, a frac manifold, or a frac tree.

The method then includes permitting fracturing fluids to flow through the pressure relief valve system while pressure signals are monitored and recorded in real time. If a pressure that exceeds the pressure threshold of the system is detected, the plug valve(s) in the pressure relieve valve system is moved by an actuator to its open position. Fracturing fluids are then permitted to escape through a relief line before the fluids reach the frac tree.

In one aspect, two or more electraulically-actuated valves, such as plug valves, are placed along the pressure relief valve system, in series. When an actuation signal is sent from the controller to open a plug valve, the controller will actually send the actuation signal to two separate actuators associated with respective plug valves. These signals are preferably sent to a separate controller that controls the actuators, wherein the actuator controller operates with an inverter. Opening two plug valves (instead of one) decreases the pressure relief time required for the pressure relief valve system and increases the safety factor for the system.

In one aspect, the method further includes continuing to pump injection fluids through the high-pressure injection line while diverting injection fluids through the opened valves. Preferably, this is done without reducing gauge pressure at the frac missile and/or in the injection line.

Figure 7:
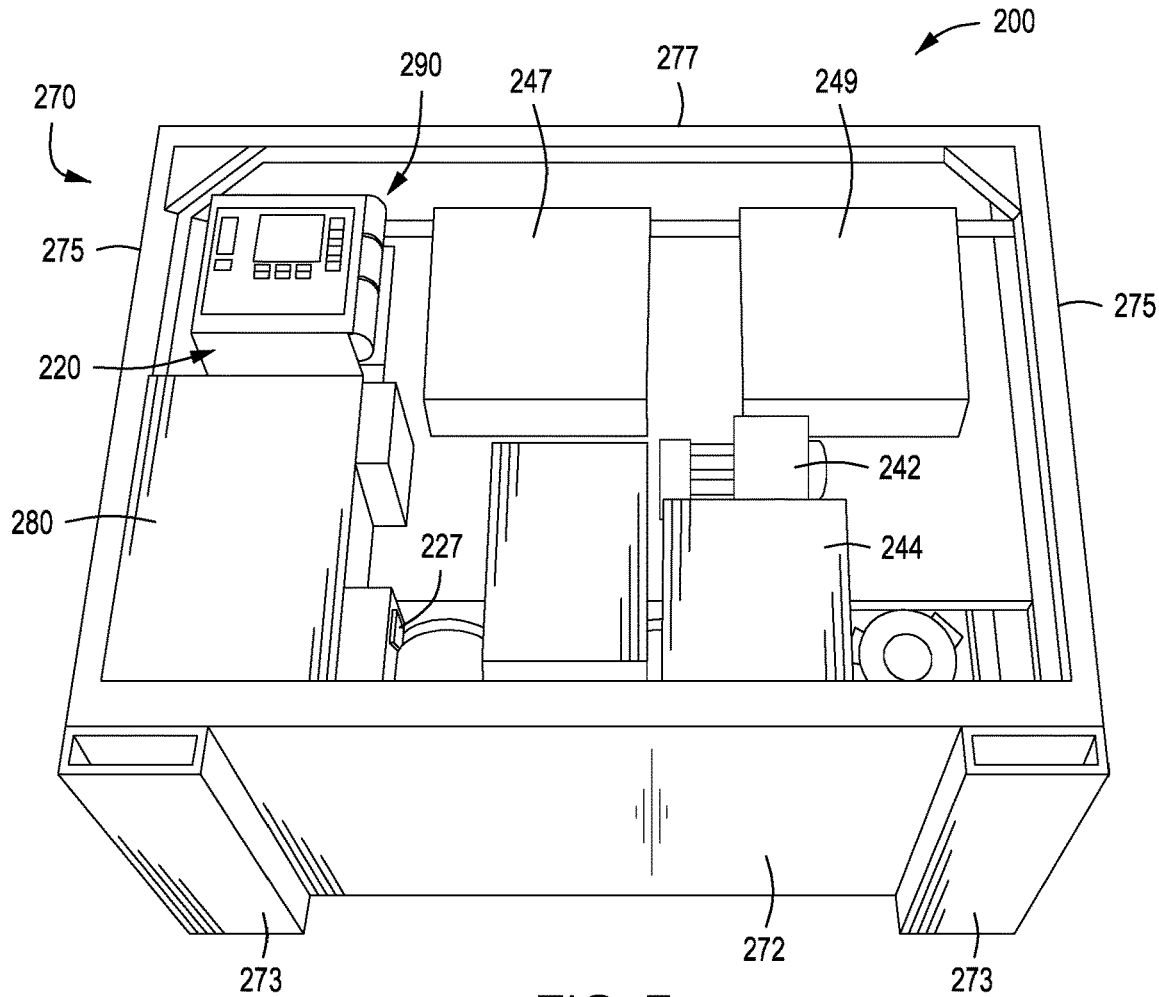
FIG. 7 is a bottom front perspective view of the pressure relief valve system of FIG. 2. The platform is more clearly seen.

Preferably, the pressure relief valve system 200 resides on a skid 270. FIG. 7 is a bottom front perspective view of the pressure relief valve system 200 of FIG. 2. The skid 270 and the platform 272 are more clearly seen.

The skid comprises a platform 272 for supporting components of the pressure relief valve system 200. The platform 272 includes a lower space reserved for forklift tines. In one aspect, forklift slots are provided along an undersurface of the platform 272.

The skid 270 comprises vertical frame members, or bracing 275, extending up from the platform 272. The skid also comprises lift points 276 configured to enable lifting such as by a chain hoist, sometimes referred to as a "come-along." The skid 270 and associated lift points 276 allow for easy transportation to and from work sites.

In one embodiment of the skid 270, a horizontal I-beam (shown at 278 in FIG. 8) is placed over the platform 272, supported by the vertical frame members 275. The overhead I-beam 278 supports a working line used for lifting the actuators 240 off of the plug valves 230 for purposes of maintenance or replacement. The working line may ride on a trolley system comprised of wheels or bearings for moving the working line laterally along the I-beam and above the platform 272. In this way, the same working line may readily be placed along the I-beam for quickly lifting the actuators 240 up off of the respective plug valves 230 efficiently. This lift system enables plug valves 230 (or poppet valves or sleeve valves as the case may be) to be inspected, lubricated and cycled in mere minutes, as opposed to the multiple hours required in connection with competing FRV systems.

It is noted that the working line may be a winch line and motor. Alternatively and more preferably, the working line may be a chain hoist (or so-called come-along) that is operated manually. A sky hook is affixed to an end of the chain hoist.

Figure 11A:
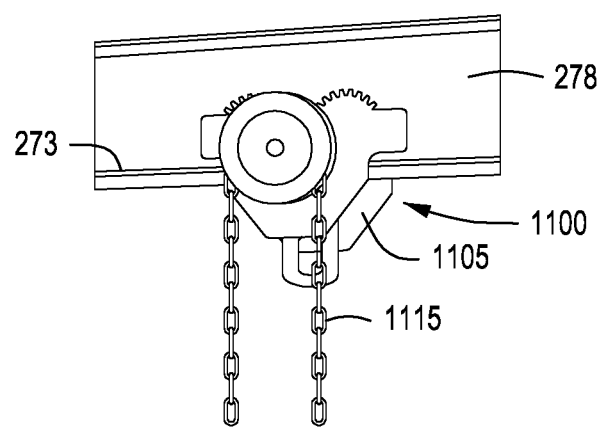
FIG. 11A is an expanded view of a portion of a horizontal I-beam for the skid, along with a trolley and chain hoist.

FIG. 11A is an expanded view of a portion of the horizontal I-beam 278 for the skid 270. A chain hoist 1100 is shown placed along the I-beam 278. The hoist 1100 is moved along a lower rail 273 of the I-beam 278 by means of a trolley 1105.

A chain 1115 extends down from and is part of the chain hoist 1100. The chain 1115 is manipulated by hand in order to raise and lower equipment. In the present application, the chain hoist 1100 and chain 1115 are used to raise and lower an actuator 240 off of a plug valve 230.

Figure 11B:
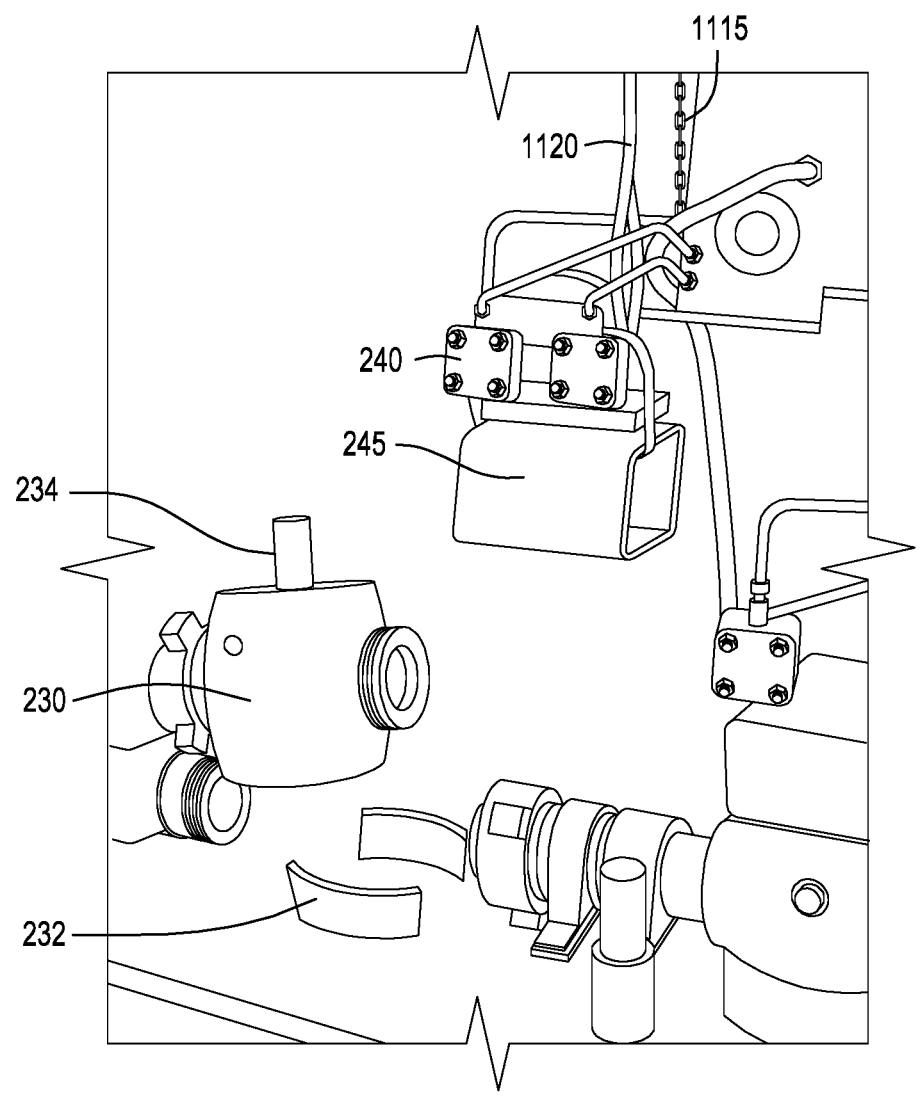
FIG. 11B shows an actuator having been lifted off of a plug valve by the use of a chain hoist and sling.

FIG. 11B shows an actuator 240 having been lifted off of a plug valve 230. A portion of the chain 1115 is visible. Also visible is a portion of a sling 1120.

For times when the system 200 needs to be maintained or repaired, there is a lock-out/tag-out 227 that disconnects all of the power from the components. In the event that a total loss of power occurs and the plug valves 230 are not able to open and relieve pressure, the 3" mechanical pop-off valve 260 will open and relieve pressure at a manufacturer-set set point.

Figure 10:
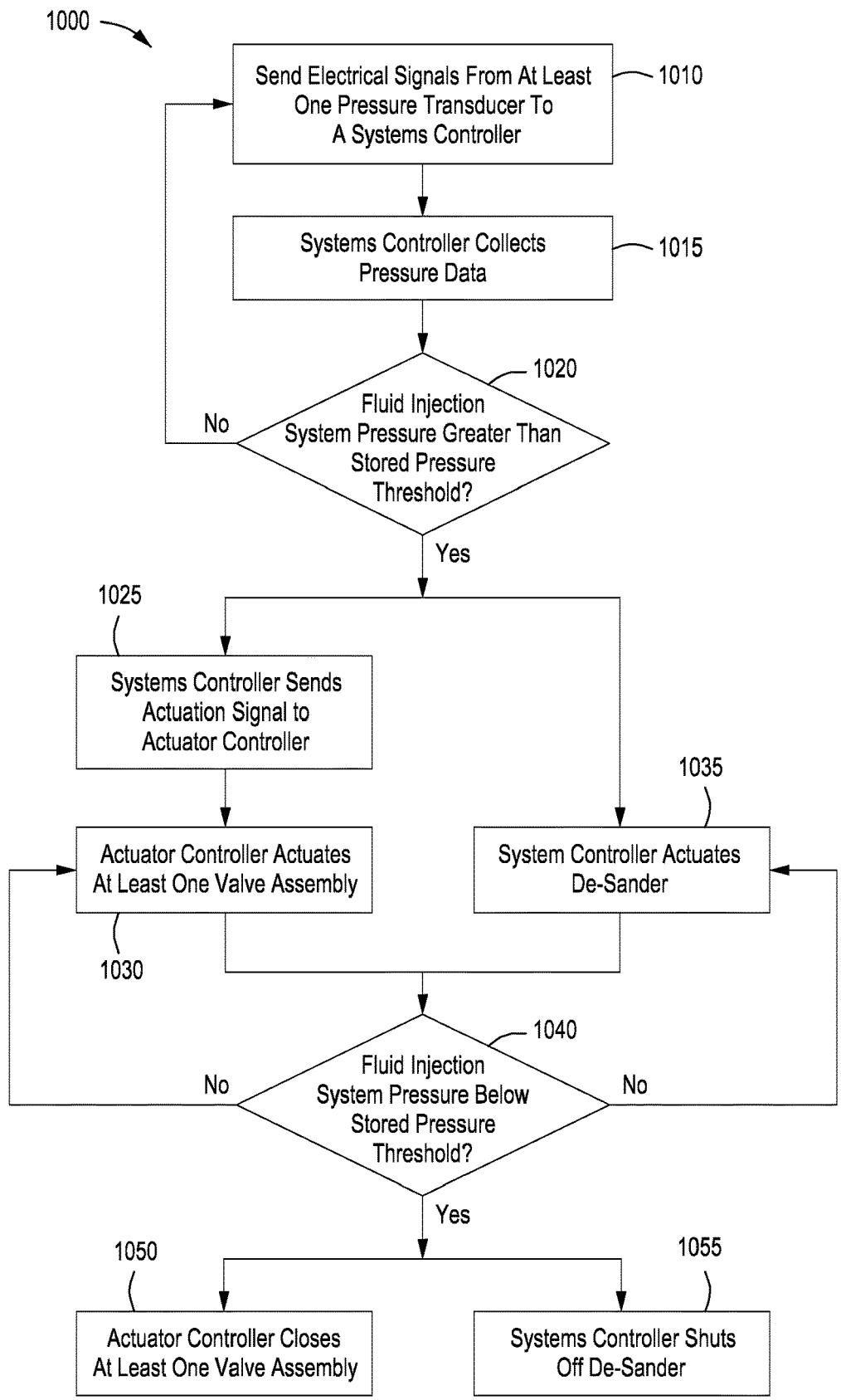
FIG. 10 is a flow chart showing operational steps for the pressure relief valve system of FIGS. 2 through 7, in one embodiment.

FIG. 10 is a flow chart 1000 showing operational steps for the pressure relief valve system of FIGS. 2 through 7, in one embodiment. In these steps, signals are first sent from at least one pressure transducer to a system controller. This is shown at Box 1010.

The signals are analog or digital signals indicative of pressure within a high-pressure injection system. Preferably, the signals are generated by a single pressure transducer residing proximate a fluid inlet of the PRV 200. The fluid inlet is in fluid communication with a high-pressure fluid injection line. The transducer may take 10, or 20, or even 50 pressure readings each second, with each reading being sent to the controller in real time.

The system controller collects the signals as pressure data. This is indicated at Box 1015. The pressure data is preferably stored in memory for later review and analysis. A memory module (or "machine readable storage medium") associated with the controller may be configured to store pressure data as received, and to selectively convey the stored information as data signals to a computational module.

As signals come into the controller, the computational module, which may be a digital signal processor (or "DSP") will compare pressure readings with a stored pressure threshold value. This is seen at Query 1020. If signals remain indicative of a system pressure below the stored threshold value, then signals continue to be sent from the transducer according to Box 1010 and the plug valves remain in their closed state.

In one aspect, a single reading by a single pressure sensor indicating that pressure in the high-pressure line has met or exceeded the stored pressure threshold will trigger the actuation signal from the system controller. In another aspect, the controller will require a second confirming signal or multiple confirming signals, from one of the at least one pressure sensors within a certain period of time also indicative of pressure greater than the stored value.

In still another aspect, pressure readings taken by the single sensor are recorded by the controller, through the memory module, in real time. These pressure readings may then be averaged by the DSP over time, such as over 0.5 to 3.0 seconds, to smooth out anomalies and to avoid false screen-out indications. The average may be, for example, a moving average, a mode, a median or derived via other averaging technique.

If a pressure value (whether from an individual pressure reading of a single transducer or from a series of pressure readings) is detected as being greater than (or greater than or equal to) the stored pressure threshold, then a signal is sent by the system controller to a separate controller that controls the actuator(s). This is provided at Box 1025. The actuator controller, in turn, sends a signal to the actuator to open the at least one valve assembly. This is seen at Box 1030.

In one aspect, the actuator (such as actuator 240) is able to activate a plug valve (such as a plug valve 230 in PRV 200) even when the fluid injection line is at a pressure as high as 10,000 psig, or even as high as 15,000 psig. Beneficially, the use of the actuator with a plug valve enables the fluid injection system to continue pumping through the injection line 250 even while the controller issues an actuation signal to open or to close the plug valve. This allows a service company to maintain circulation or injection during relief, avoiding a screen-out condition. This is in contrast to current industry practice wherein the operator must draw down pressure from the frac pumps (sometimes as low as 100 psig) while closing the FRV. With existing FRV systems so-called screen-outs or sand plugs are not uncommon. This long-standing problem is resolved herein using the current FRV system 200 and the steps of flow chart 1000.

In addition, when a pressure value is detected as being greater than (or greater than or equal to) the stored pressure threshold, then an optional separate signal is sent by the system controller to a de-sander. This is provided at Box 1035. The de-sander preferably resides along a bypass line between the high-pressure injection line and the fluid inlet of the PRV 200. The de-sander is actuated in order to at least partially remove sand from the frac slurry making up the fluid being injected.

The system controller will continue to monitor signals coming in from the at least one pressure transducer. Query 1040 asks whether the fluid injection system pressure has dropped below the stored pressure threshold. If it has not, then signals continue to be sent in order to cause the actuator controller to keep the valve in their open state. In addition, signals continue to be sent to actuate the de-sander (or, alternatively, no stop signal is sent).

If the fluid injection system pressure does drop below the stored pressure threshold, then the actuator controller closes the at least one valve assembly. This is shown at Box 1050. The step of Box 1050 preferably means that the system controller sends a command signal to the actuator controller, which then causes the actuator to close its associated plug valve.

In addition, if the fluid injection system pressure does drop below the stored pressure threshold, then the actuator controller "turns off" the de-sander. This is shown at Box 1055.

In one aspect, the pressure sensing device is not a traditional pressure transducer, but is an optical interferometer such as the Sagnac interferometer pressure sensor. The output of a Sagnac interferometer is a signal that is proportional to the time derivative of the pressure signal. Such an output signal can be integrated to produce a time series that can be proportional to the pressure variation as a function of time.

As noted in U.S. Pat. No. 9,874,432 entitled "Optical Pressure Sensor," a Sagnac sensor allows telemetry signal detection to occur without drilling holes in a high-pressure fluid line at a drill site. Sagnac sensors can be placed anywhere on the surface of a flow line to detect the leading and trailing edges of telemetry pulses in the flow line. Data from several Sagnac sensors can be combined to produce a magnified signal. Such an arrangement can also provide for a telemetry encoding scheme that depends on signal edge detection, rather than detecting pressure pulses.

In another aspect, the PRV system is equipped with a transceiver. As the controller receives pressure signals, those values are stored in the memory module. The memory module may be on-board, or may be residing remotely such as in a "cloud." In either instance, the transceiver sends stored signals through a wireless communications module, and those signals may be viewed remotely through the use of a computer-based (such as a web-based) application. When the controller receives a signal that exceeds the stored pressure threshold, then a separate signal may be sent to the operator through the application. In this way, the operator (and the operator's customer) are aware of how the job is going in terms of operations pressure at all times.

A method of servicing a PRV system is also provided herein. The method employs the electronically controlled pressure relief valve system described above in its various embodiments.

The method first comprises providing a skid. The skid defines a steel frame having a platform. A plurality of beams extend upward from the platform and support horizontally-placed beams. These horizontally-placed beams include an I-beam. The horizontal I-beam runs across the skid at a location above the actuators and associated valves.

The I-beam includes a trolley, as shown in FIG. 11A at 1105. The trolley 1105 rolls along the I-beam 278 by virtue of wheels or bearings. A lifting mechanism such as the chain hoist 1100 of FIG. 11A is secured to the trolley 1105. The chain hoist 1100 preferably includes a sky hook or a sling 1120 at an end. In this way, the sky hook or sling 1120 may be easily positioned above or moved away from a selected actuator 240.

The method also includes providing an electronically controlled pressure relief valve system. The PRV system is supported by the platform of the skid. In the context of a formation fracturing operation or other "upstream" operation, the PRV system is provided proximate a wellbore. The wellbore has been formed (or is being formed) for the purpose of producing hydrocarbon fluids to the surface in commercially viable quantities. Alternatively, the wellbore is provided for the purpose of injecting or disposing of fluids into a subsurface formation.

In one aspect, "providing" the PRV system includes rigging up the PRV skid 270. This means that a pressure relief valve (such as an FRV) residing on a skid is placed in an area designated by a service company representative or a well operator. This may be done, for example, by operating lifting equipment having one or more winch lines in order to pick up the skid at lift points, move the skid off of a trailer or truck bed, and then lower the skid 270 proximate a designated location at a well site.

The method also includes placing the pressure relief valve system in fluid communication with a high-pressure fluid injection line. Ideally, the high-pressure line extends from high pressure frac tanks (or a manifold or central valving associated with the high pressure frac tanks) to a frac tree over the wellbore. As shown in FIG. 9, the high-pressure line may be teed into an inlet of the PRV. Preferably, at least one of the one or more pressure transducers is located upstream of the exhaust outlet of the PRV.

Specific steps for placing the PRV system in fluid communication with the high-pressure fluid line may include:
- Tying in the high-pressure fluid line to the by-pass line at an inlet;
- Inspecting the sealing surface of each connection to ensure a rubber gasket is in place and that it is in good condition;
- Inspecting the face of each connection to ensure that it is in good condition and is free of debris and deep scratches;
- Using wing and thread style connections, attach the flow iron to the PRV skid; and
- Tightening hammer unions on the flow iron connections.

The method will additionally include providing power to the PRV system for testing procedures. In one aspect, providing power means that batteries associated with the PRV system are turned on. Specific steps for providing this power may include:
- Running an extension cord from a 115 VAC power unit to supply power to the PRV skid;
- Opening the battery box and ensuring that the battery charger is on and working properly, including no error messages, and that the battery lights are blinking to show that the batteries are charging properly;
- Moving a 200 Amp buss breaker inside the battery box from an Off position to an On position so that power is now sent to the computer systems (system controller and actuator controller), and to allow the accumulators to begin to charge;
- Opening the control panel system and turning the PRV system on using a Power Button; and
- Waiting for operational software to be loaded.

It is observed that connecting the extension cord will cause the batteries to begin charging. This enables power to be sent to the system controller and to the actuators.

As noted above, the PRV system is configured to be maintained in the closed state during fluid injection operations. The closed state is maintained by keeping the one or more plug valves closed. As part of the rig-up process, it is desirable to check the operation of the electraulically actuated valves. This is done by sending a test signal to the actuators to cause the valves to be rotatably opened. To do this, an ethernet cable is run from the system controller to a test computer, which may be a laptop or other computer. In one aspect, the test computer residing or otherwise placed in the operator's vehicle. Operational software associated with the system controller is loaded, and communication is established between the operator's computer and the system controller.

The method next includes sending a test signal from the test computer to the pressure relief valve system. This causes the actuators to rotatably cycle the electraulically actuated valves. Preferably, the valves are plug valves that are rotatably moved from their closed states to their respective open states in less than 1.5 seconds, or even 0.3 seconds, and with less than one complete revolution. In a preferred embodiment, lubrication is provided to the plug valve before the valves are cycled in a closed-open-closed manner. The test signal may be sent two, three or more times to facilitate complete lubrication of the plug valves.

Steps for sending the test signal may include:
Connecting ethernet cable from a control enclosure to the operator's data van;
Running the ethernet cable to a control laptop computer inside of the data van and beginning the start-up process; and
Cycling the plug valves to ensure communication between the operator's laptop computer and the PRV skid and/or to provide lubrication.

In one aspect of the method, before or in lieu of cycling the valves, the operator will change out the rotatably actuated valves. This requires that an actuator mounting bracket be disconnected from its respective valve. This is preferably done by using a hex driver and, optionally, a breaker bar to remove bolts from the mounting brackets.

Before steps are taken to remove the valves, it is preferred that the computer system be shut down by pressing the Power Button. After shut-down is complete, the operator will open the battery box and turn the 200-Amp buss fuse from the On position back to its Off position. No voltage is now being provided to the computer system and the battery box may be closed.

A hammer is used to knock loose WECO electrical connections tying into the valves. Then, using the hex drive and breaker bar, the four bolts connecting the top of the plug valves to the actuator mountings brackets are removed.

After all bolts are removed from the mounting brackets, a chain hoist (sometimes referred to in the industry as a "come-along") 1100 is moved into place over an actuator 240. The chain hoist 1100 is attached to the trolley 1105 so that it may be slidably moved (or rolled) into place over the valves 230, one at a time. Either a lifting sling 1120 (seen in FIG. 11B) or a so-called sky-hook is connected to the chain 1115.

The method then includes placing the lifting sling 1120 under an actuator 240, and then operating the chain hoist 1100 to manually lift the actuator 240 off of the valve 230. Preferably, a stem adapter (not shown) associated with the actuator 240 remains on top of a stem 234 of the plug valve 230. This ensures that damage is not done to the stem adapter during lifting and moving. The actuator 240 is then hoisted up and trollied to the side. This step is demonstrated by FIG. 11B, discussed above. The actuator 240 is preferably hoisted all the way to the last link on the come along to ensure no damage is done to any electrical cords or hydraulic hoses.

The method next includes changing out the valve. This means that a new, previously pressure-tested valve is installed in place of the old valve. Two hammer union connections are connected on each side of the plug valve to be removed. These must be knocked loose, freeing the plug valve.

Figure 12:
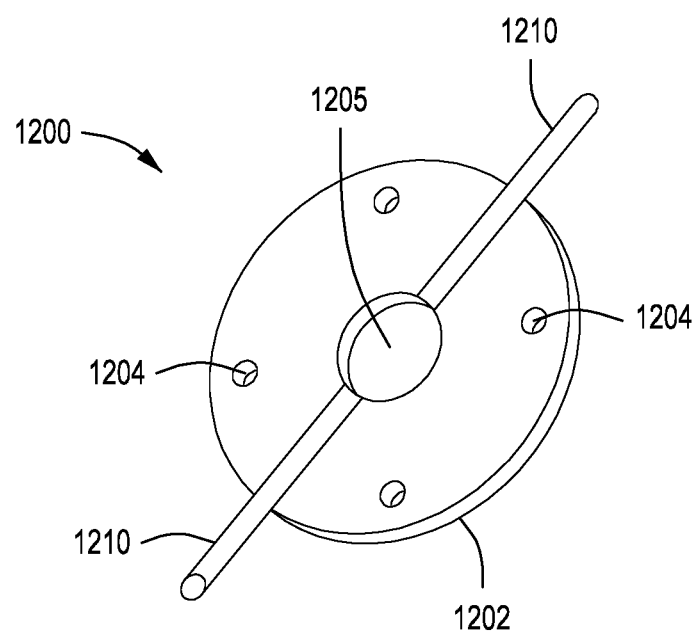
FIG. 12 is a perspective view of a plug-lifting device, in one embodiment. A pair of lifting handles is seen extending away from a center opening.

In one novel aspect of the method, a custom plug-lifting device 1200 is threadedly coupled to the old plug. FIG. 12 is a perspective view of a plug-lifting device 1200, in one embodiment. The plug-lifting device 1200 comprises a plate 1202 having a center-opening 1205 for receiving a top of the plug valve 230, and an elongated handle 1210 extending away from the center-opening 1205 in two opposing directions. In this illustrative arrangement, the handle 1210 comprises a pair of bars welded substantially along their lengths to the plate 1202.

The plate 1202 has bolt holes 1204 configured to align with the bolt holes on the plug valve 230. The plate 1202 is then placed onto the plug valve 230, and the bolts (not shown) are placed through respective bolt holes 1204 and threadedly tightened into the corresponding bolt holes of the valve 230.

Using the two bars of the handle 1210, the plug-lifting device 1200 and connected plug valve 230 are lifted out of the valve seat 232 associated with the PRV skid. This is preferably done manually by service hands. (Note that during this exercise, the actuator 240 remains hoisted above the plug valve 230 and out of the way.) The valve 230 is then moved away from the skid 270. Preferably, the old valve is taken to the operator's service van where it may be returned to the shop and serviced for future use. This process is optionally repeated for the second plug valve.

The method also includes installing new plug valves. This is done by reversing the steps associated with removing the old plug valves. In this respect, the plug-lifting device 1200 is disconnected from the old valve, and then connected to a new valve. The new valve is then manually moved into position on the skid, and lowered into position within the plug valve housing. The actuator is then rolled (or "trollied") back into position over the new valve and the chain hoist is operated in order to lower the actuator down onto the valve.

Holes in the mounting bracket of the actuator are aligned with bolt holes in the valve. The hammer union connections are tightened on each side of the plug valve using, for example, an 8-pound sledge hammer. The operator will further tighten a clamp on the PRV skid that secures valves from moving during transportation and normal frac operations using two crescent wrenches or two box ¾" box wrenches.

After the clamp has been fastened down, the operator will place two key stops onto the stem 234, and place the stem adapter over the key stops. The operator will ensure that the stem position and the actuator key stop are in their proper position. The hoisted actuator will then be moved down the I-Beam 278 into position over the plug valve 230. The four bolts are then reinserted into the bolt holes on the plug valve housing in order to secure the actuator onto the new plug valve.

The chain come-along is disconnected from the trolley 1105 and from the lift slings. After all frac iron is in place and the actuator mounting bolts are tightened, the battery box is opened and the 200-Amp buss breaker is placed in its On position. This will re-supply power to the computer systems.

When the maintenance process is completed, and after a fracing operation is completed, the PRV skid 270 will be rigged down. This may include such steps as:

Closing out the operational software for the system controller and for the actuator software;
Unplugging and rolling up the ethernet cable;
Shutting down the power in the control panel;
Shutting off the switch to the 200 Amp buss breaker;
Ensuring that the battery charger is off, e.g., making sure that no lights are blinking;
Locking out the computer and batteries;
Unplugging the extension cord from the 115 VAC power unit and PRV skid, and rolling up the cord for storage;
Breaking the high-pressure fluid line and the by-pass line connections using a no-spark hammer to loosen the hammer union connections and disconnecting the lines;
Inspecting sealing surfaces; and
Rigging up lifting slings to the pick-up points on the skid for loading onto a transport trailer, or use a forklift and forklift slots on the bottom of the skid for loading.

As can be seen, a method of servicing a PRV system is offered that has particular utility in connection with a formation fracturing operation at a well site. In this instance, the PRV system may be referred to as an FRV system. Of course, the PRV system may be used in connection with a wellbore drilling operation or an operation involving the injection of fluids into a wellbore. For example, the wellbore operation may be the hydraulic jetting of mini-lateral boreholes using a jetting hose downhole. In this instance, injection fluids are pumped at high pressures through the jetting hose and a connected jetting nozzle while the jetting hose is advanced forward into the formation. Alternatively, the PRV system may be utilized in connection with high-pressure fluid pumping in connection with a non-oil and gas operation.

Further, variations of the system and method for relieving excess pressure in a fluid pumping system may fall within the spirit of the claims, below. It will be appreciated that the inventions herein are susceptible to modification, variation and change without departing from the spirit thereof.

We claim:

1. A method of servicing a pressure relief valve (PRV) system for a fluid injection system, comprising:
providing a skid, wherein the skid defines a steel frame having a platform, a plurality of beams extending up from the platform, and an I-beam residing horizontally over the platform and supported by the upwardly-extending beams;
providing one or more pressure sensors configured to sense fluid pressure within the fluid injection system, and to generate electrical signals representative of fluid pressure readings within the fluid injection system in real time;
providing a PRV system supported by the platform of the skid, wherein the PRV system comprises:
a system controller configured to receive the electrical signals from the one or more pressure sensors, and process those signals by comparing fluid pressure readings with a stored pressure threshold, wherein the controller is programmable to set the stored pressure threshold and to send actuation signals in response to determining that the pressure in the fluid injection system meets or exceeds the stored pressure threshold;
a fluid inlet configured to receive fluids moving through the fluid injection system;
at least one electraulically-actuated valve configured to move between a closed state and an open state within a valve housing; and
an actuator configured to rotatably move a corresponding electraulically-actuated valve from its closed state to its open state in response to an actuation signal being sent by the system controller when one or more fluid pressure readings taken by one of the one or more pressure sensors exceeds the stored pressure threshold, wherein fluid pressure in the fluid injection system is relieved through a fluid outlet associated with the at least one electraulically-actuated valve when the at least one hydraulically-actuated valve is moved into its open state
and wherein each of the at least one electraulically-actuated valve is configured to fully open in less than 1.5 seconds after an actuation signal is sent by the system controller and through less than one complete revolution by the corresponding actuator.

2. The method of servicing a PRV system of claim 1, wherein the fluid injection system is (i) a hydraulic formation fracturing system, (ii) a water disposal well injection system, (iii) a drilling fluid circulation system, (iv) a hydraulic jetting system, or (v) a water flood well (or "injector") injection system.

3. The method of servicing a PRV system of claim 1, further comprising:
electrically connecting the system controller to a test computer; and
sending a test signal to the actuator in order to cycle the associated electraulically-actuated valve.

4. The method of servicing a PRV system of claim 1, wherein sending a test signal to the actuator comprises sending a test signal from the test computer to the system controller, which then sends an instructional signal to an actuator controller that controls the actuator.

5. The method of servicing of claim 4, further comprising:
before sending the test signal, lubricating the electraulically-actuated valve to be tested.

6. The method of servicing a PRV system of claim 5, wherein:
the at least one electraulically-activated valve comprises two plug valves;
the actuators for the corresponding electraulically-actuated valves are controlled by an actuator controller; and
the actuation signals from the system controller are sent to the actuator controller to open the plug valves.

7. The method of servicing a PRV system of claim 1, further comprising:
providing a trolley along the I-beam; and
providing a hoist along the I-beam, wherein the hoist is movable along a portion of the I-beam by means of the trolley.

8. The method of servicing a PRV system of claim 7, wherein the hoist is a chain come-along.

9. The method of servicing a PRV system of claim 7, wherein:
each of the or more pressure sensors is a pressure transducer;
the fluid injection system is located at a well site;
the fluid injection system comprises a fluid injection line carrying the fluids; and
the system controller is configured to generate the actuation signal to change the state of the at least one electraulically-actuated valve from its closed state to its open state when the system controller determines that a fluid pressure detected by the one or more pressure transducers at the well site has met or exceeded the stored pressure threshold;

and wherein the method further comprises placing the fluid inlet for the pressure relief valve system in fluid communication with the fluid injection line.

10. The method of servicing a PRV system of claim 9, wherein:

the at least one electraulically-activated valve comprises two plug valves;

the actuators for the corresponding electraulically-actuated valves are controlled by an actuator controller; and the actuation signals from the system controller are sent to the actuator controller to actuate the plug valves.

11. The method of servicing a PRV system of claim 9, wherein:

one of the at least one pressure transducer resides proximate the fluid inlet; and each of the at least one electraulically-activated valve is configured to open in less than 0.5 seconds after an actuation signal is sent by the system controller.

12. The method of servicing a PRV system of claim 8, further comprising:

mechanically disconnecting the actuator from its corresponding electraulically-actuated valve;

positioning the hoist over a selected actuator;

using the hoist, lifting the actuator from its associated electraulically-actuated valve; and pulling the valve from the valve body.

13. The method of servicing a PRV system of claim 10, wherein:

the hoist is a come along chain hoist; and lifting the actuator from its associated electraulically-actuated valve comprises:

removing bolts that are securing a mounting bracket associated with the actuator to its corresponding electraulically-actuated valve;

moving the chain hoist in place over the actuator;

connecting the chain hoist to the actuator;

manipulating the chain hoist to lift the actuator off of the valve; and moving the chain hoist and connected actuator along the I-beam to move the actuator away from the valve.

14. The method of servicing a PRV system of claim 13, wherein pulling the valve from the valve body comprises:

securing a plug-lifting device to the valve; and manually lifting the plug-lifting device and connected valve from the valve body.

15. The method of servicing a PRV system of claim 14, wherein:

the plug-lifting device comprises:

a plate, a center-opening within the plate for receiving a stem of the valve, a handle comprising at least two bars extending away from the center-opening, and a plurality of bolt holes through the plate, wherein the bolt holes are configured to align with bolt holes located along the valve; and securing the plug-lifting device to the valve comprises running bolts through respective bolt holes in the plate, and threadedly connecting the plate to a valve body.

16. The method of servicing a PRV system of claim 15, wherein:

the skid comprises (i) lift points along an overhead beam configured to enable lifting by a winch line, (ii) a space below a platform of the skid for receiving forklift tines, or (iii) both;

the pressure relief valve system further comprises on-board batteries configured to provide power to the system controller, the actuator controller and the actuators;

and wherein the method further comprises lifting the skid and locating the skid and PRV system at a designated location at or near a well site.

17. The method of servicing a PRV system of claim 16, wherein:

the injection fluids are frac fluids;

the fluid injection system comprises:

a frac missile configured to receive the frac fluids from frac pumps, a frac manifold configured to receive the frac fluids from the frac missile by means of the fluid injection line, and a plurality of frac lines configured to transmit frac fluids from the frac manifold to respective well heads for high pressure fluid injection; and the pressure relief valve system further comprises a fluid bypass line placing the fluid injection line in fluid communication with the fluid inlet;

and wherein the fluid outlet is configured to deliver frac fluids to a catch tank when the actuation signal is sent by the system controller and the at least one hydraulically-actuated valve is moved to its open state.

18. The method of servicing a PRV system of claim 17, wherein:

the one or more pressure transducers comprises a single transducer residing proximate the fluid inlet; and the system controller sends the actuation signal when (i) a single reading from the pressure transducer is sent that indicates a pressure that meets or exceeds the stored pressure threshold, or (ii) an average of readings from the pressure transducer represents a pressure that meets or exceeds the stored pressure threshold.

19. The method of servicing a PRV system of claim 1, wherein:

the fluid injection system is a hydraulic formation fracturing system, and the method further comprises forming fractures in a subsurface formation.

20. The method of servicing a PRV system of claim 19, wherein:

the at least one hydraulically-actuated valve and associated controllers are configured to operate at line pressures of at least 10,000 psi; and the one or more pressure sensors comprises pressure transducers or optical interferometers.

* * * * *